US010387905B2

(12) United States Patent
Nikolaev et al.

(10) Patent No.: US 10,387,905 B2
(45) Date of Patent: Aug. 20, 2019

(54) METHODS AND SYSTEMS FOR CROSS-PLATFORM PROMOTION WITH REAL MONEY APPLICATIONS

(71) Applicant: Zynga Inc., San Francisco, CA (US)

(72) Inventors: Sergei (Shawn) Nikolaev, Albany, CA (US); Josephine Gavignet, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 437 days.

(21) Appl. No.: 14/519,098

(22) Filed: Oct. 20, 2014

(65) Prior Publication Data

US 2015/0112783 A1  Apr. 23, 2015

Related U.S. Application Data

(60) Provisional application No. 61/893,812, filed on Oct. 21, 2013.

(51) Int. Cl.
G06Q 30/00 (2012.01)
G06Q 30/02 (2012.01)

(52) U.S. Cl.
CPC ............... G06Q 30/0217 (2013.01)

(58) Field of Classification Search
None
See application file for complete search history.

(56) References Cited

U.S. PATENT DOCUMENTS

| 2010/0121729 | A1* | 5/2010 | Betzler ........... A63F 13/12 705/26.1 |
| 2011/0231781 | A1* | 9/2011 | Betzler ........... G06F 12/0875 715/757 |
| 2011/0275438 | A9 | 11/2011 | Hardy et al. |
| 2011/0312423 | A1* | 12/2011 | Mosites ........... G06Q 30/0209 463/42 |
| 2012/0015714 | A1* | 1/2012 | Ocko ........... G06Q 10/10 463/25 |
| 2012/0289147 | A1 | 11/2012 | Raleigh et al. |

(Continued)

FOREIGN PATENT DOCUMENTS

WO   WO 200182174 A2   11/2001
WO   WO 2011090746 A1   7/2011

OTHER PUBLICATIONS

PCT International Search Report and Written Opinion, PCT Application No. PCT/US14/61431, dated Jan. 21, 2015.

Primary Examiner — Meredith A Long
(74) Attorney, Agent, or Firm — Penilla IP, APC

(57) ABSTRACT

A notification regarding a real-money application is transmitted to a user of a second application when the user is executing the second application. The notification conveys a reward available to the user within the second application in exchange for performing a required action in the real-money application. Upon selection of a control object by the user, the real-money application is executed with reference to the user so as to provide the user with an interface to perform the required action in the real-money application. Upon determining that the user completed the required action in the real-money application, a status of the user is updated in the second application to provide the user with the reward in the second application corresponding to completion of the required action in the real-money application.

14 Claims, 18 Drawing Sheets

(56) References Cited

U.S. PATENT DOCUMENTS

| | | | |
|---|---|---|---|
| 2012/0315993 A1* | 12/2012 | Dumont | G07F 17/3225 463/42 |
| 2013/0005466 A1* | 1/2013 | Mahajan | A63F 13/216 463/36 |
| 2013/0123018 A1* | 5/2013 | Sareli | G07F 17/3223 463/42 |
| 2013/0130781 A1* | 5/2013 | Anderson | G07F 17/3255 463/25 |
| 2013/0151342 A1* | 6/2013 | Citron | H04L 29/06034 705/14.64 |
| 2013/0339228 A1* | 12/2013 | Shuster | G06F 9/541 705/40 |

* cited by examiner

METHODS AND SYSTEMS FOR CROSS-PLATFORM PROMOTION WITH REAL MONEY APPLICATIONS

CLAIM OF PRIORITY

This application claims priority under 35 U.S.C. 119(e) to U.S. Provisional Patent Application No. 61/893,812, filed Oct. 21, 2013, entitled "Methods and Systems for Cross-Platform Promotion with Real Money Applications," the disclosure of which is incorporated herein by reference in its entirety.

BACKGROUND

As the Internet has matured, online computer applications have developed in complexity and capability. Some online computer applications involve use of real-world money, and are subject to real-world laws in force in the jurisdiction where the computer applications are executed. Such real-world laws may require the user of the computer application to satisfy certain requirements before engaging in use of real-world money within the computer application. These requirements may present a friction point for the user in deciding whether or not to engage in use of real-world money within the computer application. Reduction of the impact of such a friction point is of interest to the developers of computer applications that involve use of real-world money. It is within this context that the present invention arises.

SUMMARY

In one embodiment, a method is disclosed for executing a computer application. The method includes transmitting a notification regarding a real-money application to a user of a second application when the user is executing the second application. The notification is transmitted to the user through an interface of the second application. The notification conveys a reward available to the user within the second application in exchange for performing a required action in the real-money application. The notification includes a first control object. The method includes executing the real-money application with reference to the user upon selection of the first control object by the user. Executing the real-money application includes providing the user with an interface to perform the required action in the real-money application. The method also includes updating a status of the user in the second application to provide the user with the reward in the second application corresponding to completion of the required action in the real-money application, upon determining that the user completed the required action in the real-money application.

In one embodiment, a system is disclosed for managing a computer application. The system includes a plurality of servers for executing a computer application. One or more of the plurality of servers include logic for transmitting a notification regarding a real-money application to a user of a second application when the user is executing the second application. The notification is transmitted to the user through an interface of the second application. The notification conveys a reward available to the user within the second application in exchange for performing a required action in the real-money application. The notification includes a first control object. One or more of the plurality of servers include logic for executing the real-money application with reference to the user upon selection of the first control object by the user. Executing the real-money application includes providing the user with an interface to perform the required action in the real-money application. One or more of the plurality of servers include logic for updating a status of the user in the second application to provide the user with the reward in the second application corresponding to completion of the required action in the real-money application, upon determining that the user completed the required action in the real-money application.

Other aspects and advantages of the invention will become more apparent from the following detailed description, taken in conjunction with the accompanying drawings, illustrating by way of example the present invention.

DETAILED DESCRIPTION

Figure 1A:
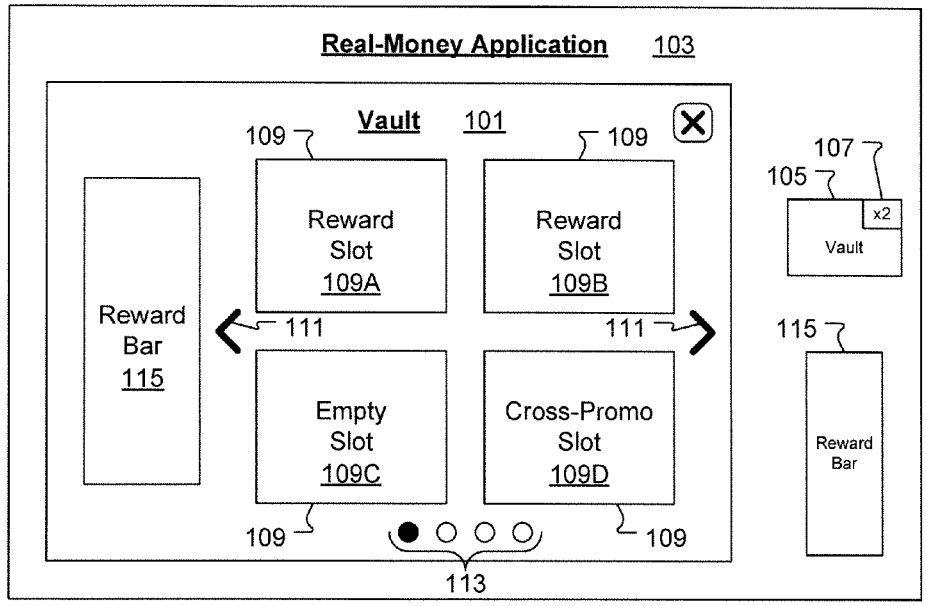
FIG. 1A shows an example of a virtual vault generated by a computer processor and displayed on a computer display within a real-money app, which is also executed by the computer processor, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

As used herein, the term "app" refers to any type of computer application that is executed by a computer processor of a computing device to generate graphical images and/or video associated with the app's execution on a display screen of the computing device, where the computing device can be of any type, including without limitation a desktop computer, a tablet computer, a laptop computer, a wearable computer, a portable device, a smart phone, a cell phone, a personal digital assistant, a computer equipped television, among others. In various embodiments, the app can be defined as a mobile app, a web app, a video game app, a music app, a global positioning system (GPS) app, a social networking app, a social-network-based video game app, or any type of app, or combination thereof. In some embodiments, the app can be contained and executed entirely on the computing device of the app user. In other embodiments, the app can be executed on a cloud computing system based on input signals received from the computing device of the app user, with graphical images associated with the app's execution transmitted from the cloud computing system to the display screen of the computing device of the app user. And, in some embodiments, the app can reside and execute partially on the computing device of the app user and partially on the cloud computing system, with reliance on communication of game data between the cloud computing system and the client device of the app user. Therefore, it should be understood that the term app as used herein refers to any type of computer application, including self-contained apps, mobile apps, and web apps, i.e., online apps.

One component of the present invention is a virtual vault defined as a unified location at which real-money rewards for a user of a real-money app are stored and accessed for redemption, i.e., claim, by the user. Depending on the real-money app, the user can earn real-money rewards by performing various required actions. In some embodiments, the various required actions can be defined to encourage further use of the real-money app by the user and/or promote the real-money app to other users. In some situations, the real-money app can have restrictions on real-money activity by a given user. For example, if the real-money app is a gambling app, local laws and ordinances applicable to the given user may require that the given user submit identification and age verification information to the real-money app before engaging in real-money gambling activity, or before redeeming a real-money reward associated with real-money gambling activity. In such cases, the virtual vault provides a mechanism by which the real-money reward for the user can be held in trust until the user is qualified to redeem the real-money reward. Also, the virtual vault provides a mechanism by which the user can accumulate and store real-money rewards for later redemption. Therefore, the virtual vault acts as a "claim box," where the user can go to "claim" their real-money rewards. Then, once a given real-money reward in the virtual vault is fully claimed, the given real-money reward is removed from the virtual vault.

FIG. 1A shows an example of a virtual vault 101 generated by a computer processor and displayed on a computer display within a real-money app 103, which is also executed by the computer processor, in accordance with one embodiment of the present invention. It should be understood that the real-money app 103 can be defined as a mobile application (app), a web app, a video game app, a social networking app, a social-network-based video game app, or any other type of app, or combination thereof. The real-money app 103 is a computer application that provides for acceptance of real-world money deposits to be used during execution of the real-money app 103 for some benefit or opportunity. Some real-world money apps 103, such as casino-type gaming applications, provide a probability of adding to an amount of deposited real-world money. While such a casino-type gaming application is an example of the real-money app 103, it should be understood that the real-money app 103 also includes other types of computer applications in which real-world money is deposited for some benefit or opportunity.

The virtual vault 101 is generated for an individual user of the real-money app 103, and is secured for access and use by the individual user of the real-money app 103. The virtual vault 101 is defined to hold in trust a number of real-money rewards for the user. Each real-money reward is redeemable for real-world monetary value within the real-money app 103. However, the user may be required to meet certain qualifications in order to redeem a given real-money reward from their virtual vault 101. The virtual vault 101 may be accessed, i.e., opened, by the user from the real-money app 103. For example, the user may select a vault icon 105 corresponding to the virtual vault 101, which in turn causes the virtual vault 101 to be opened, i.e., displayed, to the user.

Also, in some embodiments, the vault icon 105 is defined to show a count 107 of how many redeemable rewards are present in the user's virtual vault 101. It should be appreciated, that because the user is logged in to the real-money app 103, the real-money app 103 is able to query the user's virtual vault 101 data to determine how many redeemable rewards are present in the user's virtual vault 101, and in turn convey that count of redeemable rewards in the vault icon 105. Also, in some embodiments, even if the user is not logged into the real-money app 103, the vault icon 105 may be defined to show a default count of redeemable rewards available to the user if the user were to register with the real-money app 103 and log in as a registered user of the real-money app 103. In the example of FIG. 1A, the vault icon 105 shows the count of redeemable rewards as two, i.e., ×2.

It should be appreciated that the virtual vault 101 appears as an overlay above/over the real-money app 103, and includes a display conveying the rewards that are available for the user to redeem/claim, if any, and a display directing the user as to how they can obtain additional rewards. The virtual vault 101 includes a number of slots 109 in which various types of activatable graphics are displayed. If the user has a reward available for redemption, a corresponding reward graphic will be displayed in a slot 109, and that slot will become a reward slot. FIG. 1A shows two reward slots 109A and 109B. Also, a slot can be displayed in an empty state and be referred to as an empty slot, such as empty slot 109C in FIG. 1A. And, a slot can include a cross-promotion graphic and be referred to as a cross-promo slot, such as cross-promo slot 109D. Also, it should be understood that some slots 109 may be used for other purposes beyond those specifically identified herein.

The virtual vault 101 also provides for navigation through the number of slots 109 when the number of slots 109 cannot be simultaneously displayed in the virtual vault 101. In some embodiments, navigation through the number of slots 109 is performed by finger-swiping the display to scroll through a canvas of the number of slots 109. In some embodiments, navigation through the number of slots 109 is performed by using a peripheral device, such as a mouse, to swipe a cursor over the portion of the virtual vault 101 that shows the slots 109, so as to scroll through the canvas of the number of slots 109. In some embodiments, a peripheral device, such as a mouse wheel, is used to scroll through the canvas of the number of slots 109 when a cursor is positioned over the portion of the virtual vault 101 that shows the slots 109. And, in some embodiments, the virtual vault 101 includes arrows 111 that upon selection by the user will scroll through the canvas of the number of slots 109 in the direction of the selected arrow 111. Also, the virtual vault 101 includes an indicator 113 to convey how many pages of slots 109 are within the canvas of slots 109, and which page of slots 109 is currently shown in the virtual vault 101. It should be appreciated that the above-mentioned embodiments of how the number of slots 109 can be displayed and navigated in the virtual vault 101 are provided by way of example. In other embodiments, the number of slots 109 can be displayed and navigated in ways different than described with regard to the above-mentioned embodiments, so long as the various slots 109 are available for display to the user within the virtual vault 101.

Figure 2:
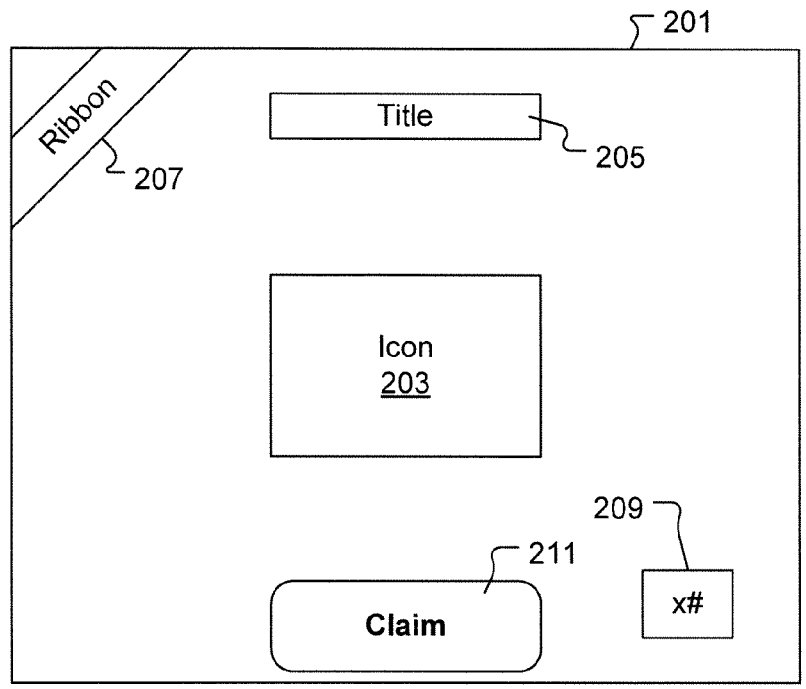
FIG. 2 shows an example of a reward graphic for display in a reward slot, in accordance with one embodiment of the present invention.

FIG. 2 shows an example of a reward graphic 201 for display in a reward slot, e.g., 109A, 109B, in accordance with one embodiment of the present invention. The reward graphic 201 provides a mechanism through which the user can redeem/claim a real-money reward from within the virtual vault 101. The reward graphic 201 includes an icon 203 defined to convey a visual reference to the type of reward associated with the reward graphic 201. The reward graphic 201 also includes a title 205 of the reward associated with the reward graphic 201. The reward graphic 201 also includes a ribbon 207 conveying a message related to the reward associated with the reward graphic 201. For example, in one embodiment, the ribbon 207 can convey the message "Real Money." The reward graphic 201 also includes an inventory number 209 of the reward associated with the reward graphic 201, where the inventory number 209 indicates how many of the particular reward associated with the reward graphic 201 are available for redemption by the user. The reward graphic 201 also includes a control object 211 that up selection by the user will initiate display of an interface through which the user can claim one or more of the particular reward associated with the reward graphic 201. The control object 211 is also referred to as a call-to-action button. The reward graphic 201 can also include any type of background image.

It should be understood that the reward graphic 201 embodiment described with regard to FIG. 2 is provided by way of example. In other embodiments, the reward graphic 201 can be defined differently than shown in FIG. 2, so long as the reward graphic conveys an identity of the particular reward associated with the reward graphic 201 and provides a control object to enable the user to redeem/claim the particular reward. It should be further understood that in some embodiments, the reward graphic 201 itself can be a control object for enabling the user to redeem/claim the particular reward, and in such embodiments, the control object 211, i.e., call-to-action button, may or may not be present.

If the user is not yet qualified to redeem/claim the reward corresponding to the reward graphic 201, selection of the control object 211 in the reward graphic 201, or in some embodiments selection of the reward graphic 201 itself, initiates display of a message and/or dialog interface defined to prompt the user to complete whatever actions are required for the user to redeem/claim the reward corresponding to the reward graphic 201. For example, if the user is not yet qualified to redeem/claim the reward, selection of the control object 211 can initiate display of a registration dialog through which the user can provide their identification and age verification information as required to participate in real-money transactions within the real-money app 103, and thereby redeem/claim the real-money reward. If the user is already qualified to redeem/claim the reward corresponding to the reward graphic 201, selection of the control object 211 in the reward graphic 201, or in some embodiments selection of the reward graphic 201 itself, initiates display of a claim graphic 301 interface through which the user can claim one or more of the particular reward associated with the reward graphic 201.

Figure 3:
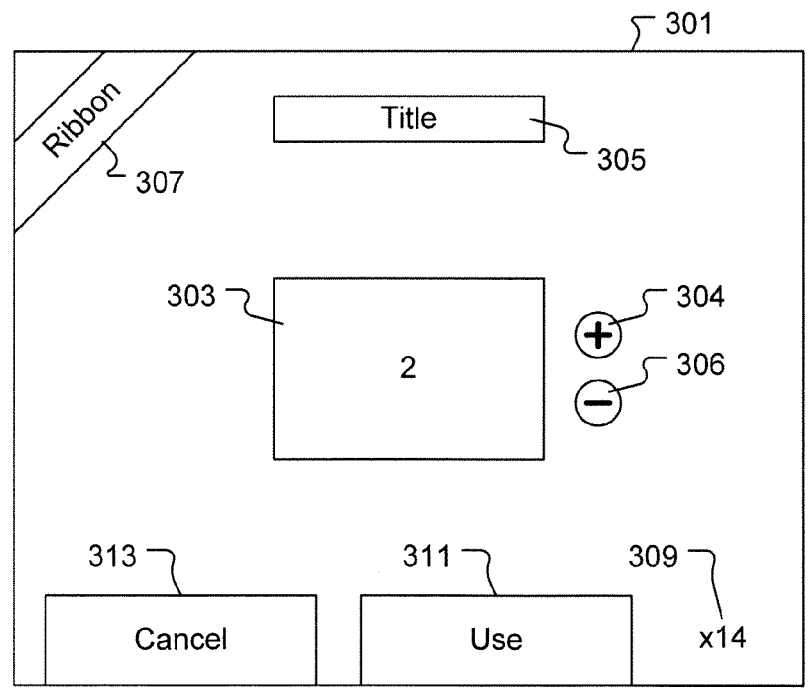
FIG. 3 shows an example of the claim graphic, in accordance with one embodiment of the present invention.

FIG. 3 shows an example of the claim graphic 301, in accordance with one embodiment of the present invention. The claim graphic 301 can also include any type of background image. The claim graphic 301 includes a title 305 of the reward associated with the claim graphic 301. The claim graphic 301 also includes a ribbon 307 conveying a message related to the reward associated with the claim graphic 301. For example, in one embodiment, the ribbon 307 can convey the message "Real Money." The claim graphic 301 also includes an inventory number 309 of the reward associated with the claim graphic 301, where the inventory number 309 indicates how many of the particular reward associated with the claim graphic 301 are available for redemption by the user. The claim graphic 301 also includes a quantity entry field 303, in which the user can enter how many of the available rewards the user wants to redeem. In one embodiment, a default number of one is present in the quantity entry field 303 upon display of the claim graphic 301. In some embodiments, the user can directly enter a number into the quantity entry field 303 by selecting the quantity entry field 303 with an input device, such as a mouse, and typing the number. Also, in some embodiments, the claim graphic 301 can also include an increment control 304 and a decrement control 306 for adjusting the number in the quantity entry field 303. Upon selection of the increment control 304 by the user, the number in the quantity entry field 303 is increased by one. Upon selection of the decrement control 306 by the user, the number in the quantity entry field 303 is reduced by one. As the number in the quantity entry field 303 is increased, the inventory number 309 is correspondingly decreased. When the inventory number 309 reaches zero, the increment control 304 is inactive. Similarly, as the number in the quantity entry field 303 is decreased, the inventory number 309 is correspondingly increased. When the number in the quantity entry field 303 is zero, the decrement control 304 is inactive.

The claim graphic 301 also includes a control object 311, i.e., call-to-action button, which upon selection by the user will initiate a process for the user to exercise the rewards that are being redeemed through the claim graphic 301. For example, if the reward associated with the claim graphic 301 is a free spin of a slot machine in an online casino application (real-money app 103), upon selection of the control object 311, the slot machine portion of the online casino application would be displayed to the user with the number of free spins as indicated in the quantity entry field 303 credited on the slot machine, at which point the user can play the slot machine. In another example, if the reward is real-world money, the user's monetary account in the real-money app 103 is credited the reward amount. The claim graphic 301 also includes a cancel button 313, which upon selection by the user will close the claim graphic 301 and re-display the corresponding reward graphic 201, from which the claim graphic 301 was initiated, without any change to the inventory number 209 of the reward associated with the reward graphic 201.

It should be understood that the claim graphic 301 embodiment described with regard to FIG. 3 is provided by way of example. In other embodiments, the claim graphic 301 can be defined differently than shown in FIG. 3, so long as the claim graphic 301 provides the user with an ability to redeem one or more of the reward represented by the reward graphic 201 from which the claim graphic 301 was initiated. Also, in some embodiments, if the inventory number 209 of the reward associated with the reward graphic 201 is one, selection of the control object 211 in the reward graphic 201 will bypass the claim graphic 301 and initiate a process for the user to exercise the reward represented by the reward graphic 201.

Figure 6:
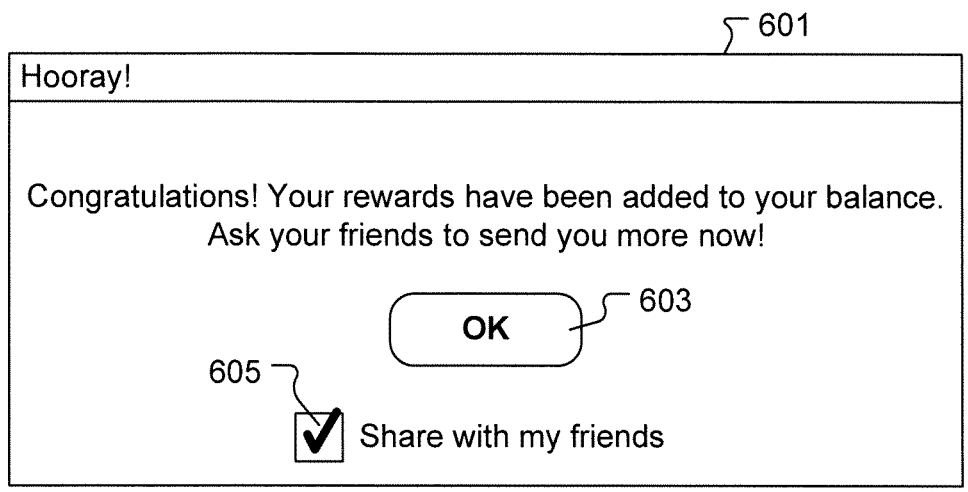
FIG. 6 shows an example of such a claim confirmation dialog, in accordance with one embodiment of the present invention.

Also, in some embodiments, upon selection of the control object 311 in the claim graphic 301, a claim confirmation dialog is displayed to the user. FIG. 6 shows an example of such a claim confirmation dialog 601, in accordance with one embodiment of the present invention. The claim confirmation dialog 601 confirms to the user that their claimed rewards have been added to their corresponding balance. For example, if the claimed reward is for five free spins of a slot machine in the online casino app, the user's slot machine will have an additional credit for five spins when the user selects the slot machine for play within the online casino app. The claim confirmation dialog 601 also includes a share toggle control 605, which upon selection by the user will indicate that the user intends to send a message (post a feed) to the members, i.e., friends, within their social network notifying of their real-money reward claim. This messaging may motivate other users to seek out their own real-money rewards within the real-money app 103. The claim confirmation dialog 601 also includes a control object 603, which upon selection by the user will close the claim confirmation dialog 601, and if the share toggle control 605 is set, send the corresponding messages to the members of the user's social network. In some embodiments, the user is prompted to select the specific members of their social network to which they want to send the message notifying of their real-money reward claim activity.

In some embodiments, as an invisible process to the user, the virtual vault 101 process is defined to maintain an accounting of reward points for the user. A reward point is a type of currency invisible to the user. Reward points can be credited to the user as an attribute of any social feature, feed, or request. Reward points can also be deducted from the user as a cost associated with a reward to be added to the user's virtual vault 101. In this manner, the reward points provide a way to track a cumulative monetary value, i.e., real-world money value, of rewards offered to the user and redeemed by the user, so as to enable tracking and control of how much the user is incentivized through real-money rewards and how much the user has claimed through real-money rewards.

In some embodiments, limits can be set on the amount of real-money rewards a user can claim per day, per week, and/or per month, etc. The amount of real-money rewards a user can redeem/claim in their lifetime can also be limited. And, in some embodiments, this limitation may be based on the user's registration status within the real-money app 103, e.g., not registered, registered for play-money use only, registered for real-money use, registered and having made real-money deposit, among others. In some embodiments, real-money reward limits are established such that the user cannot have more than a maximum number of a given reward type in their virtual vault 101 at a given time, where each reward type can have a different maximum number. Also, in such embodiments, the limit of each reward type can be indicated in the reward graphic 201 as shown in the virtual vault 101, e.g., Free Spins: 5 of 15. When the user reaches a limit of a given reward type, the virtual vault 101 process can initiate transmission of a message to the user that they need to redeem/claim the reward.

With reference back to the virtual vault 101 of FIG. 1A, in some embodiments, the empty slot 109C is a placeholder for a future reward that can be earned by the user. In this instance, the presence of the empty slot 109C conveys to the user that an additional reward can be obtained. Also, in some embodiments, the empty slot 109C conveys to the user an opportunity to earn an additional reward by taking some type of action, and provides the user with a control object for initiating the required action to earn the additional reward.

Figure 4:
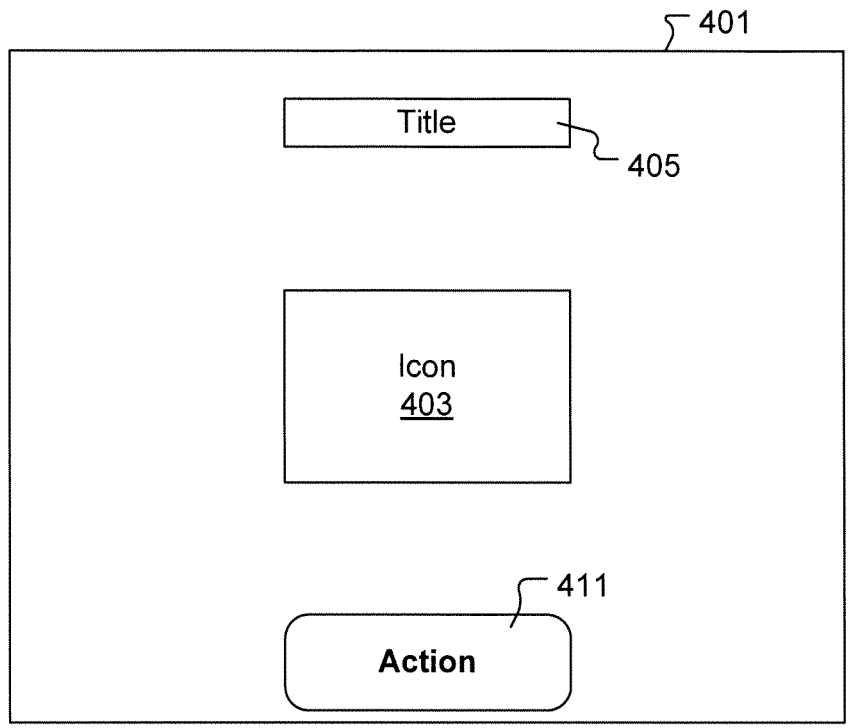
FIG. 4 shows an empty slot graphic, in accordance with one embodiment of the present invention.

FIG. 4 shows an empty slot graphic 401, in accordance with one embodiment of the present invention. The empty slot graphic 401 can include any type of background image. The empty slot graphic 401 includes an icon 403 defined to provide a visual reference to the user that an opportunity exists to earn a reward to fill the corresponding slot 109. The empty slot graphic 401 can also include a title 405. The empty slot graphic 401 also includes a control object 411, i.e., call-to-action button, that up selection by the user will initiate display of an interface through which the user can proceed with a task directed toward obtaining an opportunity to earn another reward. For example, in one embodiment, the control object 411 initiates display of an interface through which the user can request other users, e.g., social network friends, for assistance in getting another reward opportunity.

With reference back to the virtual vault 101 of FIG. 1A, the cross-promo slot 109D is defined to convey to the user an opportunity available in another application separate from the real-money application 103. For example, in some embodiments, the available opportunity may simply be playing the other application. In other embodiments, the available opportunity may be obtaining a reward or advantage in the other application. Also, in some embodiments, the other application may be another application to which the user has already registered. Or, in some embodiments, the other application may be another application to which the user had not yet registered. Also, in some embodiments, the other application may have a relationship with the real-money application 103, such as common ownership or an established cross-promotion agreement.

It should be understood that the empty slot graphic 401 embodiment described with regard to FIG. 4 is provided by way of example. In other embodiments, the empty slot graphic 401 can be defined differently than shown in FIG. 4, so long as the empty slot graphic 401 conveys to the user an opportunity to earn another reward. It should be further understood that in some embodiments, the empty slot graphic 401 itself can be a control object for initiating display of an interface through which the user can request other users, e.g., social network friends, for assistance in getting another reward opportunity, and in such embodiments, the control object 411, i.e., call-to-action button, may or may not be present.

Figure 5:
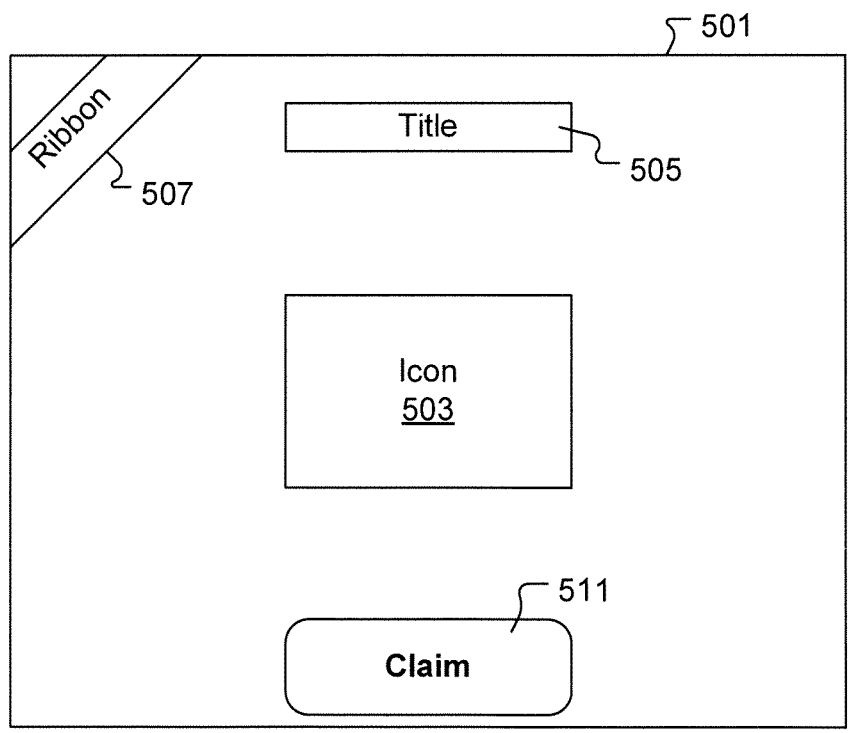
FIG. 5 shows an example of a cross-promo graphic for display in the cross-promo slot, in accordance with one embodiment of the present invention.

FIG. 5 shows an example of a cross-promo graphic 501 for display in the cross-promo slot 109D, in accordance with one embodiment of the present invention. The cross-promo graphic 501 can include any type of background image. The cross-promo graphic 501 includes and icon 503 defined to provide a visual reference to the user of the other application to which the cross-promotion is directed. The cross-promo graphic 501 can also include a title 505 of the cross-promotion. The cross-promo graphic 501 also includes a ribbon 507 conveying a message related to the cross-promotion. The cross-promo graphic 501 also includes a control object 511, i.e., call-to-action button, which upon selection by the user will launch the other application to which the cross-promotion is directed, and in some instances display an interface within the other application related to the cross-promotion activity as conveyed to the user in the cross-promo graphic 501. Therefore, it should be appreciated that the cross-promo graphic 501 provides a mechanism through which the user can navigate to another app.

It should be understood that the cross-promo graphic 501 embodiment described with regard to FIG. 5 is provided by way of example. In other embodiments, the cross promo graphic 501 can be defined differently than shown in FIG. 5, so long as the cross promo graphic 501 conveys the cross-promotion activity to the user. It should be further understood that in some embodiments, the cross-promo graphic 501 itself can be a control object for launching the other application to which the cross-promotion is directed, and in such embodiments, the control object 511, i.e., call-to-action button, may or may not be present.

In some embodiments, the cross-promo graphic 501 can represent rewards available in another app. However, the cross-promo graphic 501 does not allow redemption of the reward that is available in the other app. Rather, the cross-promo graphic 501 allows the user to navigate to the other app by clicking on the cross-promo graphic 501 or the control object 511 therein, upon which the other cross-promoted app is opened in a new display area. In some embodiments, the cross-promo graphic 501 is displayed after the user has achieved a minimum level of advancement in the current real-money app 103, so as to avoid distracting the user from further progression in the current real-money app 103.

With reference back to FIG. 1A, the virtual vault 101 can also include display of a reward bar 115. The reward bar 115 is a computer graphic displaying a status of a real-money reward for the user of the real-money app 103. The reward bar 115 includes an indication of what progress has been made toward receiving a given real-money reward. As shown in FIG. 1A, the rewards bar 115 can be shown inside the virtual vault 101, or in conjunction with the virtual vault 101, such as in the real-money app 103, to provide the user with a visual depiction of the status of the reward that is currently being pursued and with a control object through which the user can access a dialog to advance progress toward receiving the real-money reward. In one embodiment, real-money rewards are offered one-at-a-time to the user. Therefore, in this embodiment, the reward bar 115 corresponds to a single real-money reward sought by the user. Any real-money reward that is earned by the user through the reward bar 115 is placed in the user's virtual vault 101. Therefore, the user's reward bar 115 is linked to the user's virtual vault 101. And, the reward bar 115 feeds the virtual vault 101 with real-money rewards.

Figure 7A:
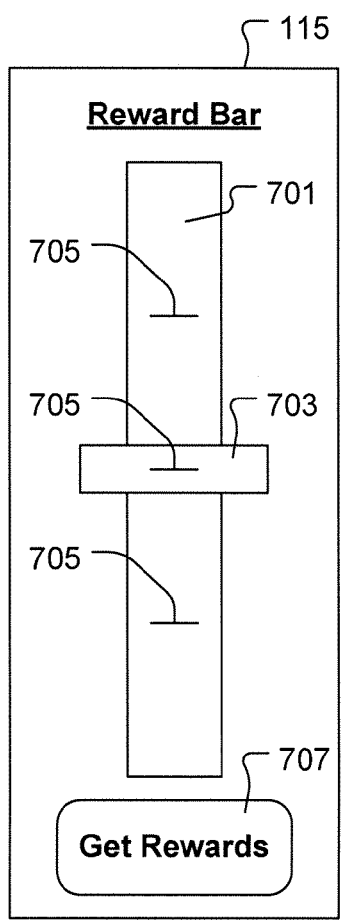
FIG. 7A shows an example layout of the reward bar, in accordance with one embodiment of the present invention.

FIG. 7A shows an example layout of the reward bar 115, in accordance with one embodiment of the present invention. The reward bar 115 includes a progress bar 701 defined to display the user's progress toward getting the real-money reward. A marker 703 is positioned along the progress bar 701 to indicate where the user is with regard to completing the required actions to get the real-money reward. One end of the progress bar 701 is a starting position of the marker 703, indicating no progress made toward getting the real-money reward. And, the opposite end of the progress bar 701 is a completion position of the marker 703, indicating completion of the required actions to get the real-money reward. In some embodiments, the progress bar 701 includes tick marks 705 to help visual the amount of progress that has been made and that still needs to be made toward getting the real-money reward. In some embodiments, the tick marks 705 respectively correspond to actions required to get the real-money reward. For example, if the user needs to get help from four friends to earn the real-money reward, the progress bar 701 would include three tick marks 705, with each tick mark 705 and the end of the progress bar 701 respectively representing a separate one of the four friend assistance actions that are needed.

The reward bar 115 also includes a control object 707, i.e., call-to-action button, which upon selection by the user will initiate a process by which the user can take further action toward earning the real-money reward represented by the reward bar 115. The reward bar 115 can be in one of three different states, including 1) not started, 2) in-progress, and 3) completed. Depending on the state of the reward bar 115, selection of the control object 707 will initiate display of a particular dialog through which the user can take action to progress toward earning the reward or collect the reward.

In some embodiments, progression toward earning the real-money reward is achieved by sending requests to other persons, e.g., social network friends, for assistance and having the other persons respond to the requests. For ease of description, these "other persons" are referred to herein as "friends" within a social network of the user. However, it should be understood the some embodiments the "other persons" can include people outside of a given social network of the user. For example, a given real-money reward may require a fixed number of friends to respond to a request for assistance. And, the reward bar 115 may be defined to incrementally move the marker 703 along the progress bar 701 as each friend responds to the request for assistance. So, each friend that receives a request for assistance from the user can respond to the request and thereby contribute to the user's reward bar 115 progression. The fixed number of friends required to assist in order to earn a given real-money reward can be based on various attributes of the user within the context of the real-money app 103, or can be randomly set by the real-money app 103.

Figure 8A:
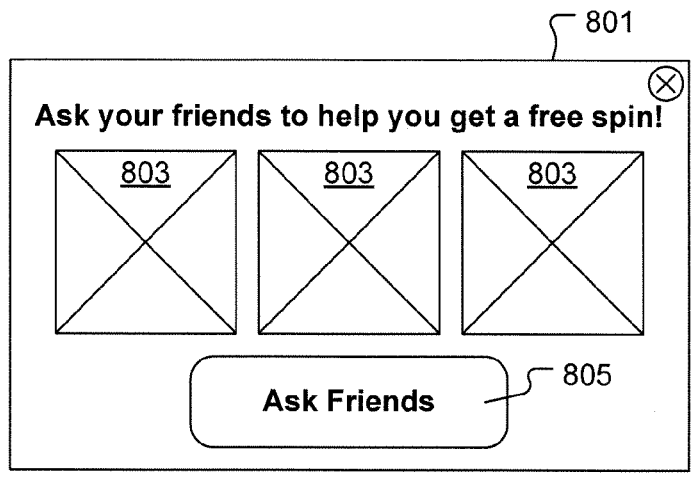
FIG. 8A shows a dialog interface displayed to the user upon selection of the control object within the reward bar, in accordance with one embodiment of the present invention.

FIG. 8A shows a dialog interface 801 displayed to the user upon selection of the control object 707 within the reward bar 115, in accordance with one embodiment of the present invention. The dialog interface 801 includes a message to the user conveying a required action, such as "Ask you friends to help you get a free spin!" In this embodiment, the dialog interface 801 displays a number of action slots 803, corresponding to the number of actions required by the user to earn the real-money reward. For instance, in the example dialog interface 801 of FIG. 8A, the user needs to get assistance from three friends to earn the real-money reward represented by the reward bar 115. So, in this example, the dialog interface 801 shows three action slots 803, with each action slot 803 corresponding to one of the three friends that are required to earn the real-money reward. Because the dialog interface 801 of FIG. 8A represents the "not started" state of the reward bar 115, all three of the action slots 803 are empty.

Figure 9:
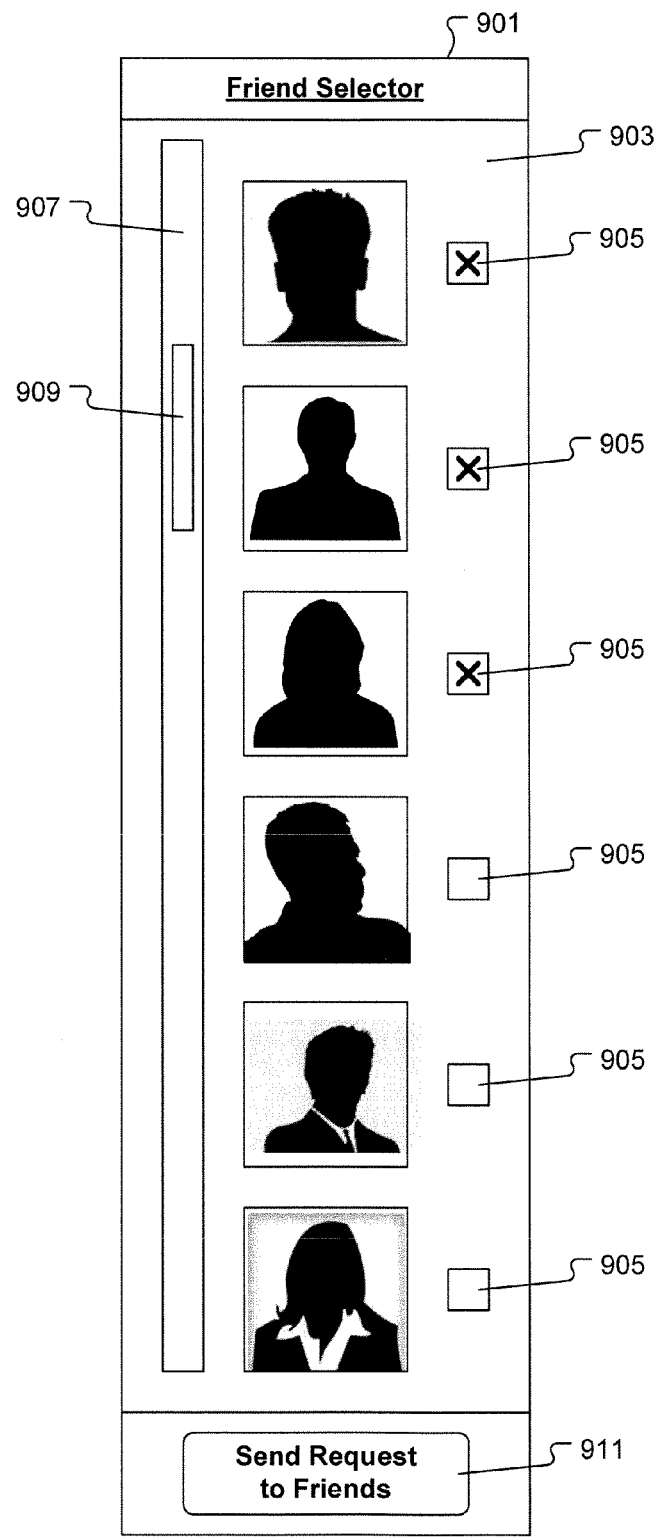
FIG. 9 shows an example of a multi-friend selector (MFS) dialog that is displayed to the user upon selection of the control object within the dialog interface of FIG. 8A, in accordance with one embodiment of the present invention.

The dialog interface 801 also includes a control object 805, i.e., call-to-action button, which upon selection by the user will initiate a process through which the user can send requests for assistance to selected friends. In one embodiment, selection of the control object 805 by the user launches a multi-friend selector process which displays a multi-friend selector dialog to the user. FIG. 9 shows an example of a multi-friend selector (MFS) dialog 901 that is displayed to the user upon selection of the control object 805 within the dialog interface 801 of FIG. 8A, in accordance with one embodiment of the present invention. The MFS dialog 901 shows a listing of friends 903 that can be selected by the user, by toggling a corresponding selection box 905, to receive a request for assistance message. In some embodiments, the MFS dialog 901 can also include scroll bar 907 along which the user can move a scroll marker 909 to navigate through the listing of friends 903. In other embodiments, the user can navigate through the listing of friends 903 by finger-swiping the display over the listing of friends 903, or by other input means, such as mouse input and/or keyboard/keypad input.

In one embodiment, during installation of the real-money app 103, an installation option is provided to allow the user's social network to share the user's friend listing with the real-money app 103. In this embodiment, the real-money app 103 can retrieve and store the user's friend list and periodically check with the social network for updates to the user's friend list. Then, upon initiation of the MFS dialog 901, the user's friend list stored by the real-money app 103 is used to populate the listing of friends 903 in the MFS dialog 901. In various embodiments, the listing of friends 903 can include a profile picture of each friend and/or name of each friend.

The MFS dialog 901 also includes a control object 911, i.e., call-to-action button, which upon selection by the user initiates a process by which a request for assistance message is transmitted to each friend in the listing of friends 903 whose corresponding selection box 905 is toggled on, i.e., marked. In this manner, the MFS dialog 901 provides a means by which the user can send requests for assistance in earning the real-money reward to friends. In some embodiments, a limit can be set on the number of friends that can be selected by the user at a given time to help with earning a real-money reward. However, in other embodiments, no such limit is set.

Figure 8B:
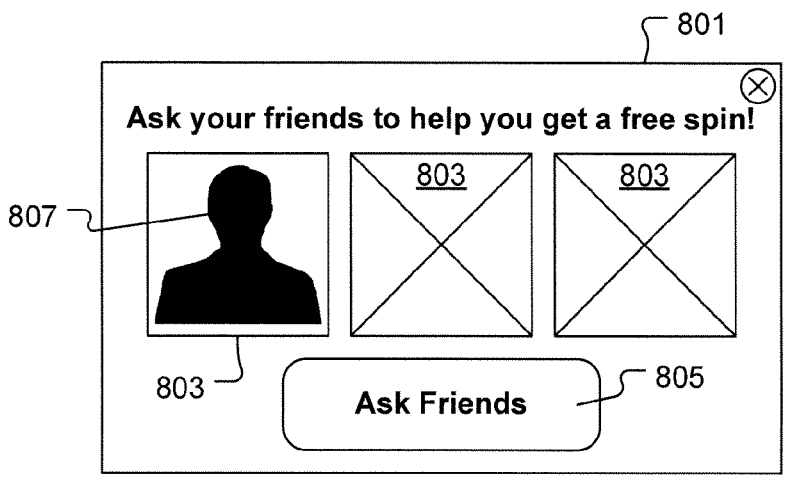
FIG. 8B shows the dialog interface after a friend has agreed to help by accepting the request from the user, in accordance with one embodiment of the present invention.

Through the MFS dialog 901, the user can send request for assistance in earning the real-money reward to various friends. If the friend accepts the request from the user and agrees to help, a notice is sent to the user that the particular friend helped. Upon receipt of this notice, the user has an option to send a thank you gift to the friend that helped. In some embodiments, the thank you gift is a number of game coins for use in either the real-money app 103 or another app related to the real-money app 103, where the gifted game coins are provided at no charge to the user, i.e., the gifted game coins are contributed by the real-money app 103 to the general economy of the real-money app 103. When the friend agrees to help by accepting the request from the user, the friends identity is associated with the real-money reward represented by the reward bar 115, and the friend occupies an action slot 803 in the dialog interface 801. For example, FIG. 8B shows the dialog interface 801 after a friend 807 has agreed to help by accepting the request from the user, in accordance with one embodiment of the present invention. In this example, the profile picture of the friend 807 is shown in one of the action slots 803. Also, it should be understood that the MFS dialog 901 and the user's listing of friends used to populate the listing of friends 903 therein are linked to the reward bar 115 and to the dialog interface 801 of FIGS. 8A and 8B.

Figure 8C:
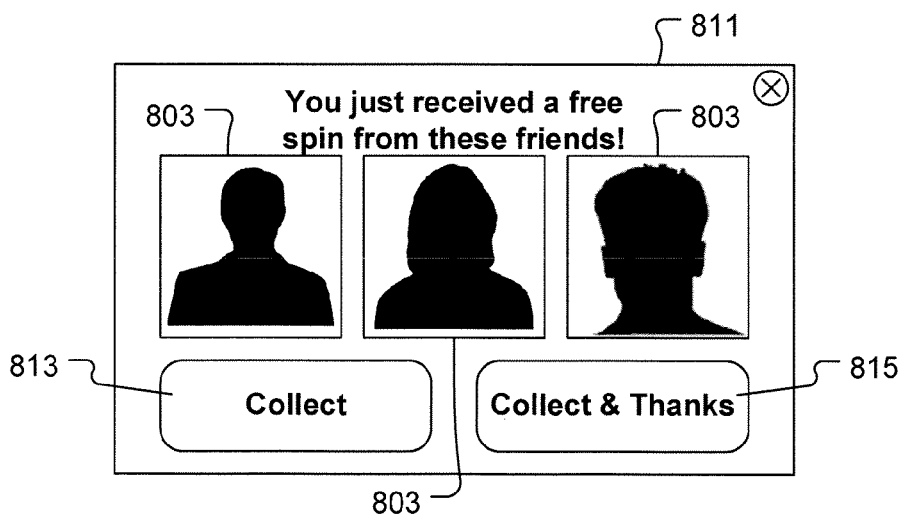
FIG. 8C shows an example of the collection dialog, in accordance with one embodiment of the present invention.

When the user has received assistance from all the friends required to earn the real-money reward, and upon selection of the reward bar 115 or control object 707 thereon, a collection dialog is displayed to the user. FIG. 8C shows an example of the collection dialog 811, in accordance with one embodiment of the present invention. The collection dialog 811 shows a message to the user that the required actions for earning the real-money reward have been completed. For example, the collection dialog 811 shows the message "You just received a free spin from these friends!" The collection dialog 811 also shows the friends that helped to earn the real-money reward in each of the action slots 803. In one embodiment, the collection dialog 811 includes a collect button 813 and a collect and thanks button 815. Selection by the user of the collect button 813 initiates a process in which the earned real-money reward is added to the user's virtual vault 101, the collection dialog 811 is closed, and the user's virtual vault 101 is displayed.

Selection by the user of the collect and thanks button 815 initiates a process in which the earned real-money reward is added to the user's virtual vault 101, the collection dialog 811 is closed, the user's virtual vault 101 is displayed, and a thank you gift is sent to each friend that helped. In some embodiments, the thank you gift is a number of game coins for use in either the real-money app 103 or another app related to the real-money app 103, where the gifted game coins are provided at no charge to the user, i.e., the gifted game coins are contributed by the real-money app 103 to the general economy of the real-money app 103. So, a friend that helps the user can get a gift at the time they help and/or when the real-money reward is finally earned.

In one embodiment, if the user receives more help than is needed, the extra help does not count towards the next real-money reward. A user cannot "save" a help received. Meaning that if the user has 6 helps in his inbox, but only needs 4 helps, the user cannot save the other 2 helps. Each help request is linked to a specific real-money reward. And, likewise, each received help corresponds to a specific real-money reward. Therefore, if extra helps in the user inbox are received and accepted after the specific real-money reward is completed, the extra helps have no effect on any other real-money reward. However, acceptance of the extra help responses can cause a gift to be sent to the friends that helped, even though their help did not contribute toward completing the real-money reward. In one embodiment, once a given real-money reward has been completed/earned, extra helps received in the user's inbox for that real-money reward can be automatically placed under an "Expired Gifts" tab.

Figure 10A:
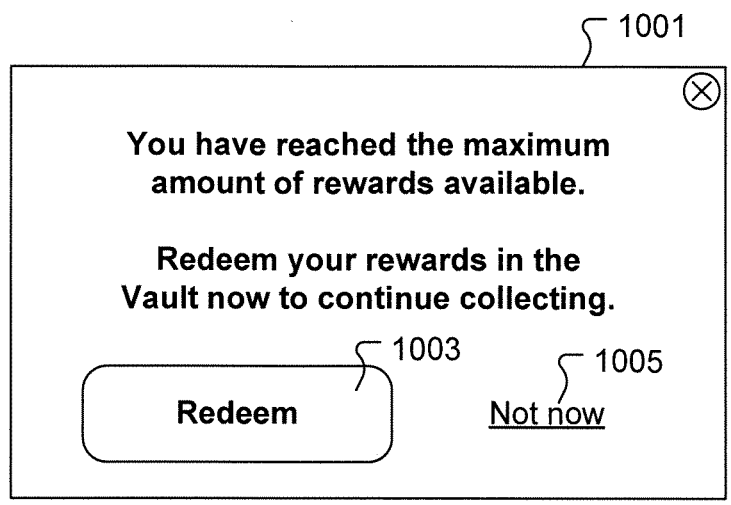
FIG. 10A shows an example of a warning dialog that may be displayed when the user selects the control object in the reward bar that is either not started or in-progress, when the user is at the limit of real-money rewards that can be accumulated at a given time, in accordance with one embodiment of the present invention.
Figure 10B:
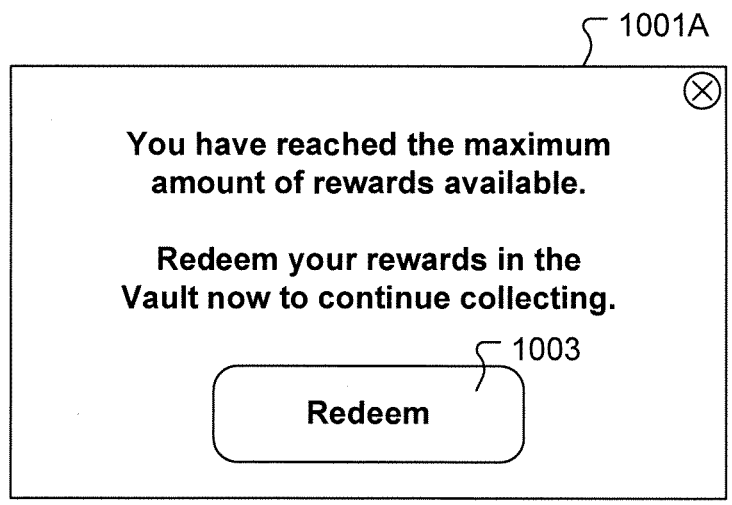
FIG. 10B shows a modified version of the warning dialog for FIG. 10A for display when the user completes the requirements to earn the real-money reward associated with the reward bar, in accordance with one embodiment of the present invention.

In some embodiments, a limit is placed on the number of real-money rewards that a user can accumulate before the user reaches certain milestones. If the user has reached such a limit, selection of the control object 707 in the reward bar 115 can initiate display of a warning dialog. FIG. 10A shows an example of a warning dialog 1001 that may be displayed when the user selects the control object 707 in the reward bar 115 that is either not started or in-progress, when the user is at the limit of real-money rewards that can be accumulated at a given time, in accordance with one embodiment of the present invention. The warning dialog 1001 conveys a message to the user of being at the real-money reward limit. For example, the warning dialog 1001 of FIG. 10A shows the message "You have reached the maximum amount of rewards available. Redeem your rewards in the vault now to continue collecting." The warning dialog 1001 includes a redeem button 1003, which upon selection by the user causes the warning dialog 1001 to close and the user's virtual vault 101 to open, to provide for redemption of real-money rewards by the user. The warning dialog 1001 includes a not now button 1005, which upon selection by the user causes the warning dialog 1001 to close and the dialog interface 801 of FIG. 8A to by displayed. In this manner, although the user is at their real-money reward limit, the user can continue trying to earn the real-money reward associated with the reward bar 115. However, when the user completes the requirements to earn the real-money reward associated with the reward bar 115, a modified version of the warning dialog 1001A is displayed that only provides the user with the redeem button 1003, as shown in FIG. 10B, thereby requiring the user to redeem some of the their real-money rewards from their virtual vault 101.

It should be understood that the status of the user can vary in the real-money app 103. For example, the user may be either a non-registered user, a non-deposited registered user, or a deposited registered user, where deposited refers to the user's deposit of real-money into the real-money app 103. When the user accesses the real-money app 103, the status of the user is determined and the real-money reward that the user is currently pursuing is determined, so that the reward bar 115 can display the correct information. In some embodiments, if the status of the user changes while the user is progressing towards a given real-money reward, the user will continue working on the given real-money reward based on the status of the user when the given real-money reward progress was started. Then, upon completing the given real-money reward, the user's new status will be considered for the next real-money reward challenge.

In some embodiments, the real-money app 103 provides a system for creating and managing real-money rewards by establishing a real-money reward tree based on user type (status) in order to manage cost and tune difficulty and reward value based on user type. The reward tree defines the ordering, definition, and cost of real-money rewards by user type. In one embodiment, the reward tree includes the following attributes:

Reward type: The type of real-money reward the user is receiving.

Reward cost: The amount of reward points a user needs to have to be offered the real-money reward.

Reward amount: How many of the real-money reward type the user will receive upon completing the associated reward bar 115.

Reward order: When the real-money reward is offered in the reward tree.

Reward cap (optional): If the user has at least the reward cap amount of the real-money reward type in their virtual 101 vault already, the user will not be offered the real-money reward type, and the next real-money reward in the reward tree will be considered for offering to the user.

The reward tree is defined at the user type level. For example, the following reward tree can be established for a non-registered user: (free_spin;100RP;1;1;null), (free_spin;200RP;2;2;null), (cash;200RP;5;3;50)—which means that a non-registered user will be awarded first a free spin at the cost of 100 rewards points (RP), with no cap. Then, the user will be awarded 2 free spins after 200 rewards points, with no cap. Then, the user will be awarded $5 cash, capped at $50 in the user's virtual vault 100, after 200 rewards points. Also, in some embodiments, the reward type can be replaced by a bonus code, provided that a listing of bonus codes is defined for each reward type within the real-money app 103, with the ability to create new bonus codes.

In one embodiment, if the user completes all the rewards in the user's reward tree, the user's reward tree resets back to the beginning and cycles through until the user changes user types. Also, the reward tree system provides an option to shut down a reward tree for a given user, if necessary. And, limits can be set on how many rewards the user is allowed to complete before registering, before making a first deposit, before making a next deposit, respectively, and so on. For example, a limit may be set such that the user can only collect 10 rewards (of each type) before registration, 5 rewards before the first deposit, and then 5 more rewards until each subsequent deposit. It should be appreciated that such limits can reduce the risk of free-loaders and increase the rate of deposits by the user within the real-money app

103. Additionally, the reward tree system is defined to provide for acceleration or cancellation of a given real-money reward.

In the real-money app 103, users can be categorized based on more attributes that just whether or not the user is registered. For example, users can be categorized based on how many requests the user has sent in a specified period of time, and/or the size of the user's active social network. Therefore, the reward tree system can create new user types based on different combinations of user attributes. The reward tree system can also assign user type identifiers for the different user types and filter users based on the user type identifiers. And, the reward tree system can create reward trees that are tailored to the various user types.

Figure 1B:
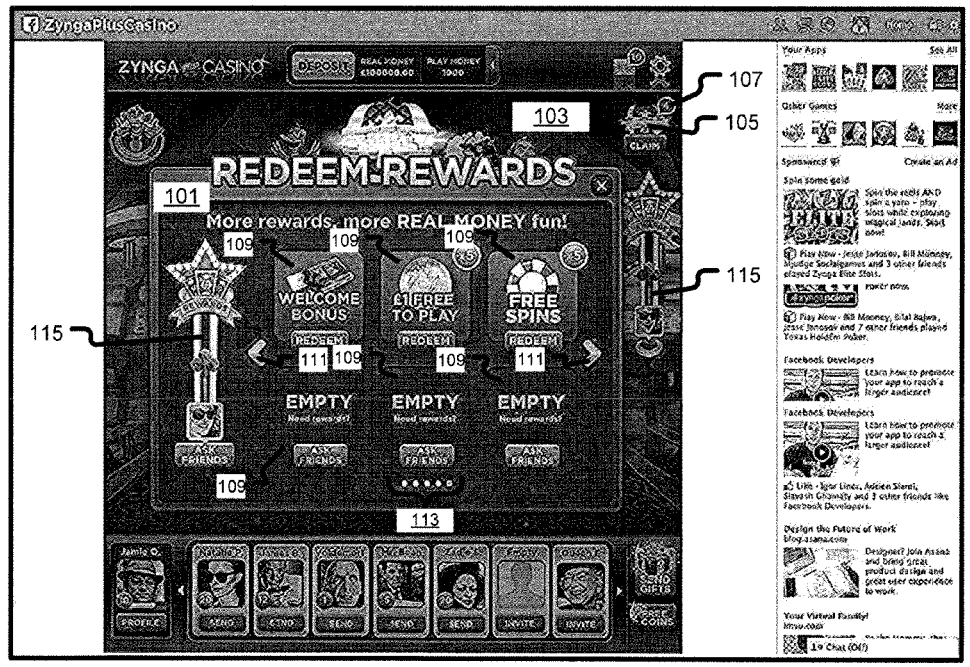
FIG. 1B shows an example of the virtual vault when the real-money app is the online casino app, in accordance with one embodiment of the present invention.
Figure 7B:
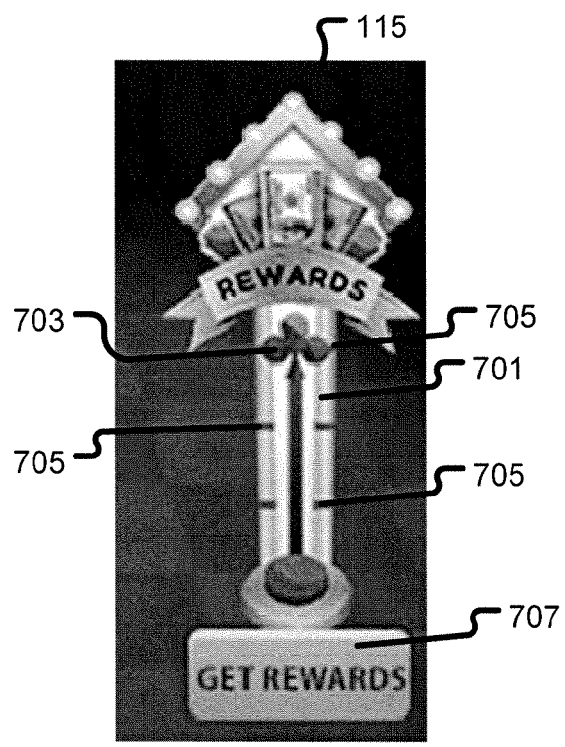
FIG. 7B shows an example of the reward bar in the online casino app, in accordance with one embodiment of the present invention.

In one embodiment, the real-money app 103 is an online casino app. FIG. 1B shows an example of the virtual vault 101 when the real-money app 103 is the online casino app, in accordance with one embodiment of the present invention. Also, FIG. 7B shows an example of the reward bar 115 in the online casino app, in accordance with one embodiment of the present invention. In the case of the online casino app, legal restrictions may forbid the participation of a user until they complete a registration process to verify their identity and that they satisfy a minimum age requirement. Therefore, such legal restrictions can prevent the giving of real-money rewards within the online casino app to users that have not completed the required registration process. However, the virtual vault 101 provides a means by which the user can be incentivized to complete their registration process by allowing the un-registered user to have earned real-money rewards held in trust within their virtual vault 101 until they complete the required registration process so that they can redeem their real-money rewards from their virtual vault 101.

Therefore, users can be offered and earn real-money rewards before they commit to registering in the online casino app. And, the presence of these real-money rewards in the user's virtual vault 101 provides an incentive to the user to complete their registration process. In some embodiments, users earn real-money rewards by sending virals, performing play money activity within the online casino, and/or by coming back frequently to play in the online casino app. Also, some real-money rewards may require the user to have made a deposit in the online casino app before they can redeem the real-money reward. In this case, the real-money reward provides an incentive to the user to make a real-money deposit and advance further in their play of the online casino app.

In some embodiments, when the user registers for real-money play in the online casino app, the user is prompted with a registration funnel that displays the information needed from the user for registration, as well as the real-money rewards the user will receive upon completing their registration. When the user triggers the registration funnel, the first registration interface of the funnel can appear as an overlay above the casino lobby in the online casino app. The registration interface can include a "You get this" section showing the real-money rewards available to the user for completing their registration process. Therefore, the "You get this" section incentivizes the user to complete their registration process.

If the user is coming to the online casino app from a cross-promotion initiative, the user is tagged as such so that the user can see their offered rewards from the cross-promotion activity during registration. The first registration interface of the registration funnel can require entry of a minimum amount of information to avoid overwhelming the user and driving the user away from the registration process. The first registration interface can also require entry of at least an email address so that the user can be contacted if they do not complete the registration process. The registration interface can also be defined to display information ("tool tips") for various data entry fields to explain to the user what needs to be filled out and why. In one embodiment, the registration funnel for the online casino app can include a first "Login Info" registration interface, and a second "Real-Money Info" registration interface.

Some real-money rewards may be offered to the user to incentivize their registration and real-money deposit activity. Other real-money rewards are earned by the user through the reward bar 115. All real-money rewards for the user are placed in the user's virtual vault 101. In the online casino app, the user is not allowed to redeem real-money rewards from their virtual vault 101 until the user has a certain status in the online casino app. Various status levels in the online casino app can include non-registered player, registered non-deposited player, and registered deposited player. Upon the user selecting a real-money reward to claim within their virtual vault 101, the online casino app determines whether or not to require the user to sign-in, require the user to complete the user registration process, require the user to make a deposit, or proceed with allowing the user to redeem the selected real-money reward.

For example, if the user is a non-registered user and attempts to claim a particular real-money reward from their virtual vault 101, the user is first shown a registration dialog and a message that they need to complete their registration process. Then, when the user completes their registration process, if the particular real-money reward requires a user deposit prior to redemption, the user is shown a deposit dialog and a message that they need to make a minimum real-money deposit before they redeem the particular real-money reward. Or, when the user completes their registration process, if the particular real-money reward does not require a user deposit prior to redemption, the user is credited with the particular real-money reward. After a user has successfully claimed a reward, the user sees a dialog for confirmation. From this confirmation dialog, the user can be shown the MFS dialog 901 of FIG. 9, through which the user can select friends to message regarding their real-money reward claim.

In one embodiment, the online casino app provides the user with an opportunity to send a "mystery gift" to one or more friends, where the mystery gift includes at least one real-money reward. For example, in one embodiment, the mystery gift is sent by the user as a social network request to one or more friends, e.g., a Facebook request. In this embodiment, the real-money reward is not charged to the mystery gift sender. For example, the online casino app assumes the cost of the real-money reward in the mystery gift. The real-money reward in the mystery gift is worth real-money value within the online casino app, such as cash or free casino game play.

Figure 11:
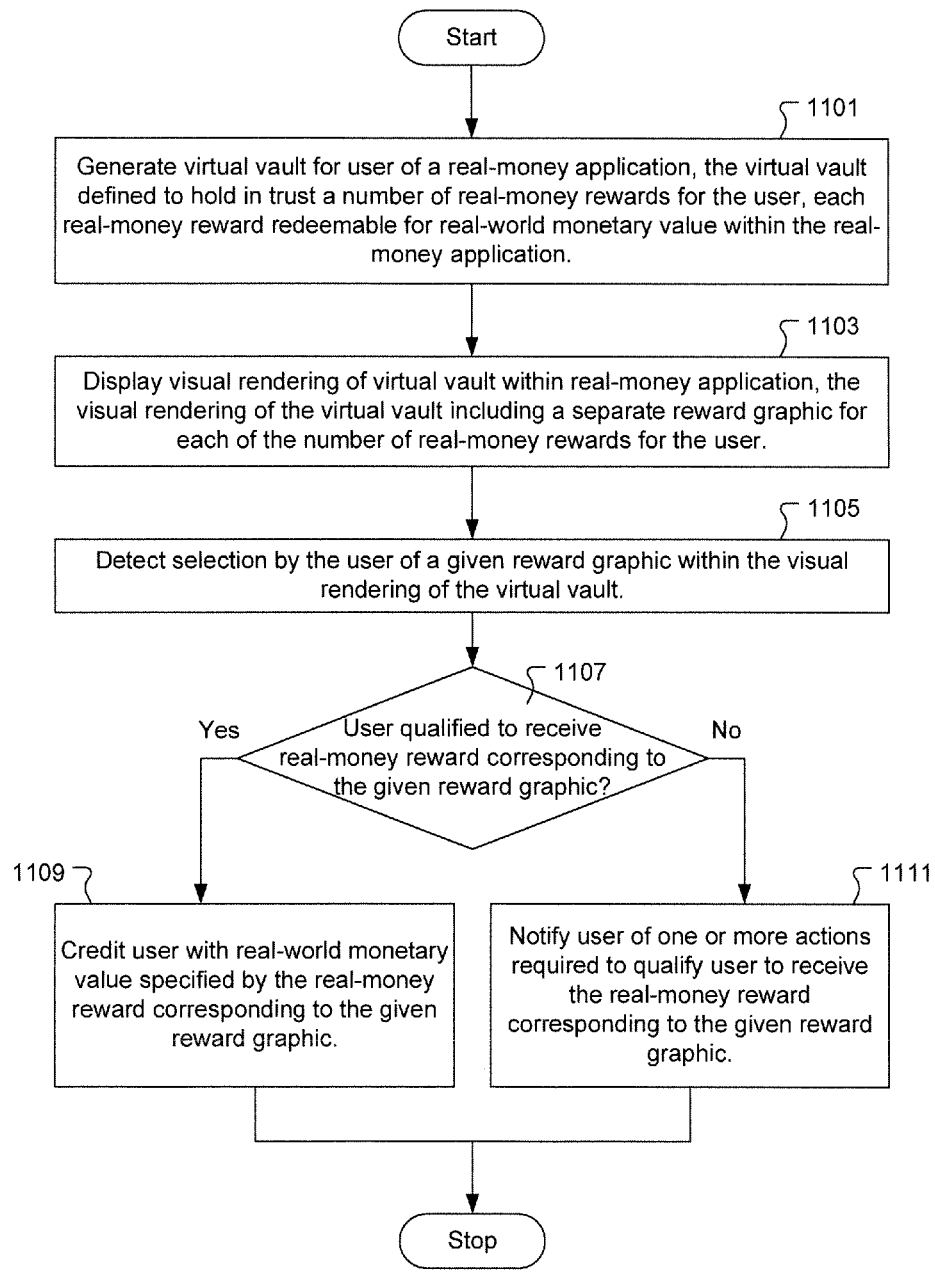
FIG. 11 shows a flowchart of a method for executing a computer application, in accordance with one embodiment of the present invention.

FIG. 11 shows a flowchart of a method for executing a computer application (app), in accordance with one embodiment of the present invention. In one embodiment, the method of FIG. 11 is a computer implemented method executed by a processor. Again, the app referred to in the method of FIG. 11 can be defined as a mobile app, a web app, a video game app, a music app, a global positioning system (GPS) app, a social networking app, a social-network-based video game app, or any type of app, or combination thereof. In one example embodiment, the app is an online casino game.

The method includes an operation 1101 for generating a virtual vault for a user of a real-money app. The virtual vault is defined to hold in trust a number of real-money rewards for the user. Each real-money reward is redeemable for real-world monetary value within the real-money app. The method also includes an operation 1103 for providing data for displaying a visual rendering of the virtual vault within the real-money app. In some embodiments, displaying the visual rendering of the virtual vault in operation 1103 is triggered by selection of a vault-related graphic within the real-money app. Also, in some embodiments, displaying the visual rendering of the virtual vault in operation 1103 occurs upon startup of the real-money app. The visual rendering of the virtual vault includes a separate reward graphic for each of the number of real-money rewards for the user. In some embodiments, the separate reward graphic for each of the number of real-money rewards includes an identifier for the corresponding real-money reward, an inventory count for the corresponding real-money reward, and a control object that upon selection will initiate a claim process for the corresponding real-money reward.

The method also includes an operation 1105 for detecting selection by the user of a given reward graphic within the visual rendering of the virtual vault. Then, an operation 1107 is performed to determine whether or not the user is qualified to receive a real-money reward corresponding to the given reward graphic. In some embodiments, determining whether or not the user is qualified to receive the real-money reward corresponding to the given reward graphic in operation 1107 is performed in response to detecting selection by the user of a control object in the given reward graphic. In some embodiments, determining whether or not the user is qualified to receive the real-money reward corresponding to the given reward graphic in operation 1107 includes verifying that the user has completed a required registration process and/or verifying that the user has deposited a required amount of real-world currency into the real-money app.

If the operation 1107 determines that the user is qualified to receive the real-money reward corresponding to the given reward graphic, the method proceeds with an operation 1109 for crediting the user with a real-world monetary value specified by the real-money reward corresponding to the given reward graphic. In some embodiments, the real-world monetary value specified by the real-money reward is a number of free plays of a pay-per-play game within the real-money app. In some embodiments, the real-world monetary value specified by the real-money reward is a cash amount of deposit to an account of the user within the real-money app.

If the operation 1107 determines that the user is not qualified to receive the real-money reward corresponding to the given reward graphic, the method proceeds with an operation 1111 notifying the user of one or more actions required to qualify the user to receive the real-money reward corresponding to the given reward graphic. In some embodiments, each of the number of real-money rewards that the user is not qualified to receive is designated as an unqualified real-money reward, and the virtual vault is defined to hold each unqualified real-money reward in trust until the user becomes qualified to receive the unqualified real-money reward.

In some embodiments, the method of FIG. 11 further includes an operation to receive a communication for the user within the real-money application, where the communication includes a real-money gift designated for the user. In these embodiments, the real-money gift is placed within the virtual vault for the user as one of the number of real-money rewards for the user. In one embodiment, a system for managing a computer application includes a plurality of servers for executing a computer application, wherein one or more of the plurality of servers include logic for performing the operations of the method of FIG. 11.

Figure 12:
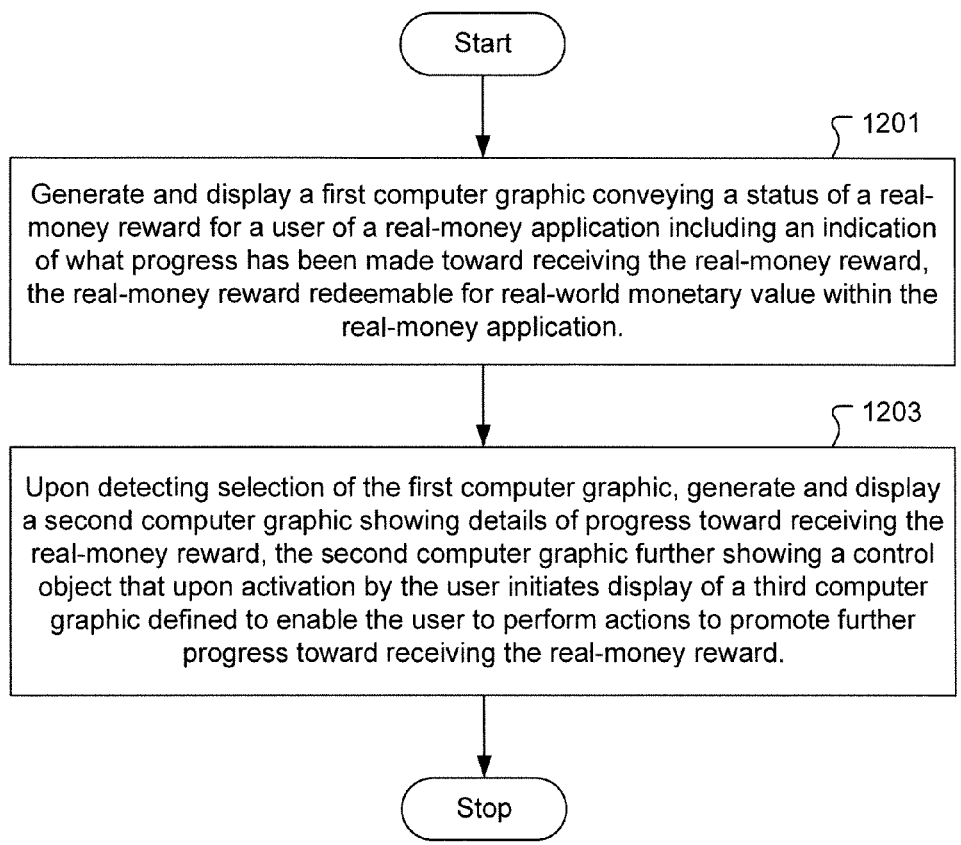
FIG. 12 shows a flowchart of a method for executing a computer application, in accordance with one embodiment of the present invention.

FIG. 12 shows a flowchart of a method for executing a computer application (app), in accordance with one embodiment of the present invention. In one embodiment, the method of FIG. 12 is a computer implemented method executed by a processor. Again, the app referred to in the method of FIG. 12 can be defined as a mobile app, a web app, a video game app, a music app, a global positioning system (GPS) app, a social networking app, a social-network-based video game app, or any type of app, or combination thereof. In one example embodiment, the app is an online casino game.

The method includes an operation 1201 for generating and displaying a first computer graphic conveying a status of a real-money reward for a user of a real-money app, including an indication of what progress has been made toward receiving the real-money reward. The real-money reward is redeemable for real-world monetary value within the real-money app. In some embodiments, generating and displaying the first computer graphic in operation 1201 occurs upon startup of the real-money application. The method also includes an operation 1203 for generating and displaying a second computer graphic showing details of progress toward receiving the real-money reward upon detecting selection of the first computer graphic. The second computer graphic further shows a control object that upon activation by the user initiates display of a third computer graphic defined to enable the user to perform actions to promote further progress toward receiving the real-money reward.

In some embodiments, the first computer graphic shows a progress bar and a marker positioned on the progress bar, where a position of the marker on the progress bar indicates an amount of progress that has been made toward receiving the real-money reward. In some embodiments, the second computer graphic shows one or more tasks that have been completed toward receiving the real-money reward and one or more tasks that have not been completed toward receiving the real-money reward. In some embodiments, a set of tasks required to receive the real-money reward includes obtaining assistance from a number of persons, where each of the number of persons provides assistance by replying to a request for assistance from the user. And, the third computer graphic is defined to enable the user to send requests for assistance to the number of persons. In some embodiments, the requests for assistance are transmitted through a social network to which the user is registered.

In one embodiment, the third computer graphic is a friend selector dialog showing a listing of friends known to the user within the social network and providing a selection mechanism to enable selection by the user of one or more friends within the listing of friends, where selection of a given friend through the friend selector dialog triggers transmission of a request for assistance to the given friend. Also, a response to a given request for assistance is transmitted to the real-money application to which the real-money reward is associated. In some embodiments, the real-world monetary value specified by the real-money reward is a number of free plays of a pay-per-play game within the real-money app. In some embodiments, the real-world monetary value specified by the real-money reward is a cash amount of deposit to an account of the user within the real-money app.

In some embodiments, the method also includes an operation for determining whether or not all tasks required to receive the real-money reward have been completed; and placing the real-money reward in a virtual vault for the user of the real-money application upon determining that all tasks required to receive the real-money have been completed. The virtual vault is defined to hold in trust a number of real-money rewards for the user. Also, in some embodiments, the method of FIG. 12 can further include the operations of the method of FIG. 11. In one embodiment, a system for managing a computer application includes a plurality of servers for executing a computer application, wherein one or more of the plurality of servers include logic for performing the operations of the method of FIG. 12.

In one embodiment, a user executing a social app is sent a message notifying the user that they can receive various levels of rewards in the social app if they complete certain actions in a real-money app. For example, a user playing the social app FARMVILLE is sent an in-game message that they will be given a "special bull" on their game board in FARMVILLE if they visit and complete certain actions in the real-money app ZYNGAPLUSCASINO. The required actions in the real-money app can be defined to draw the user into further play of the real-money app, such as but not limited to play-money registration, real-money registration, making a first deposit, and making subsequent deposits. In some embodiments, the rewards received by the user in the social app are displayed to the user as the user completes the required actions in the real-money app. Therefore, within the context of the reward, the actions of the user in the real-money app are linked to the user's play within the social app.

In some embodiments, the cross-platform rewards process described above can provide the user with a reward that is an in-game object within the user's social app environment. This in-game object can be used as a channel for providing messages to the user within the social app about the real-money app that was associated with the acquisition of the in-game object. For example, if an "exclusive bull" was placed on the user's FARMVILLE game board as a reward for performing a certain action in ZYNGAPLUSCASINO, the exclusive bull can be used to communicate offers available on ZYNGAPLUSCASINO to the user during the user's play of FARMVILLE. For example, a user who is actively playing FARMVILLE, but has stopped playing on ZYNGAPLUSCASINO, can receive a message in FARMVILLE through the exclusive bull that there is a special promotion currently running on ZYNGAPLUSCASINO. This can also be done through the introduction of Missions, MOTD's (messages of the day), etc.

It should be understood that reference to FARMVILLE and ZYNGAPLUSCASINO as examples of the social app and real-money app, respectively, is in no way meant to limit the various embodiments of the invention as disclosed herein. In other words, the various embodiments of the invention as disclosed herein can be applied to any social app, where FARMVILLE is one of many examples, and to any real-money app, where ZYNGAPLUSCASINO is one of many examples.

Figure 13:
FIG. 13 shows an example of an in-game message displayed in a social app for cross-promotion of a real-money app, in accordance with one embodiment of the present invention.

FIG. 13 shows an example of an in-game message 1301 displayed in a social app 1302 for cross-promotion of a real-money app, in accordance with one embodiment of the present invention. In some embodiments, the in-game message 1301 is a cross-promotion message notifying the user that the real-money app has launched and that they can receive a unique in-game object for use in their social app 1302 in exchange for visiting and/or progressing in the real-money app. For example, the in-game message 1301 of FIG. 13 notifies the user that they will receive various levels of rewards in the social app 1302 FARMVILLE if they complete various actions in the real-money app ZYNGAPLUSCASINO. In this particular example, the user will be given a "special bull" on their FARMVILLE game board if they visit ZYNGAPLUSCASINO. Then, the "special bull" will be upgraded to bigger and better types of bulls as the user performs additional actions in real-money app ZYNGAPLUSCASINO, such as sign-up, join as a player, and make a real-money deposit. In this example, the "special bull," i.e., the in-game object, serves as a reminder to the user when playing the social app 1302 of the real-money app and the rewards available to the user in the real-money app.

Also, it should be understood that the in-game object reward is one of many types of rewards that can be offered to the user as part of the social app-to-real-money app cross-promotion. For example, in some embodiments, the user can be offered a reward of game currency to be used in their social app, and be provided with a persistent user interface element for conveying messages related to the cross-promotion associated with the reward of game currency. The in-game message 1301 also provides a control object 1303, i.e., call-to-action button, which upon selection by the user will open the real-money app ZYNGAPLUSCASINO on the user's display.

Figure 14:
FIG. 14 shows an example landing page of the real-money app that can be displayed to the user upon selecting the control object within the in-game message displayed in the social app, in accordance with one embodiment of the present invention.

FIG. 14 shows an example landing page of the real-money app ZYNGAPLUSCASINO that can be displayed to the user upon selecting the control object 1303 within the in-game message 1301 displayed in the social app 1302, in accordance with one embodiment of the present invention. When the user visits the real-money app, the user is notified that they have been awarded the in-game object in the social app 1302 associated with the cross-promotion activity. Also, within the real-money app, the user is shown messages 1401 notifying that completion of the registration process and making real-money deposits in the real-money app will continue to yield rewards for the user in the social app 1302 associated with the cross-promotion activity.

Figure 15:
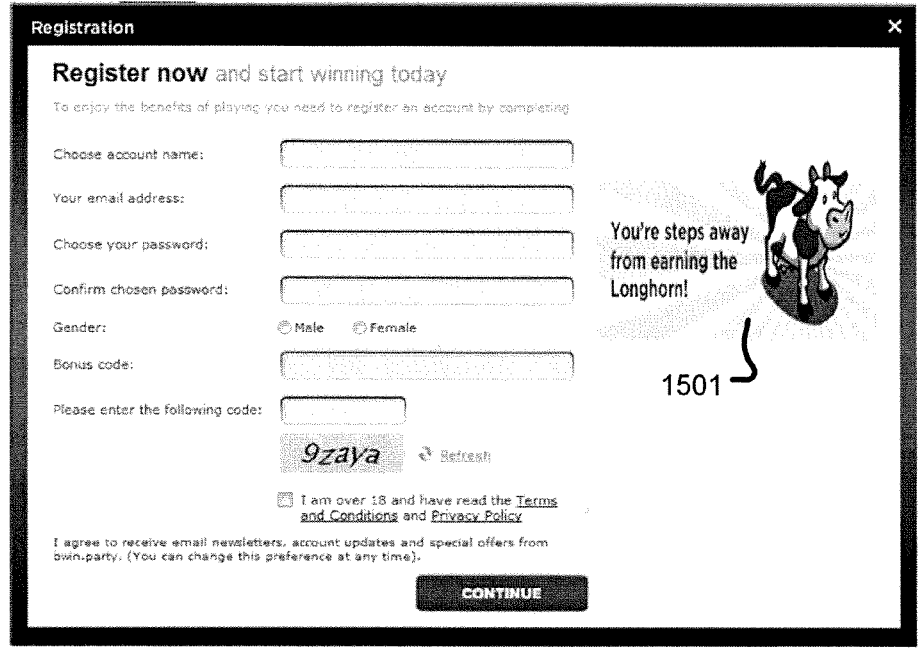
FIG. 15 shows an example registration page of the real-money app that can be displayed to the user upon the user's action to proceed with registration, in accordance with one embodiment of the present invention.

FIG. 15 shows an example registration page of the real-money app ZYNGAPLUSCASINO that can be displayed to the user upon the user's action to proceed with registration, in accordance with one embodiment of the present invention. As part of the cross-promotion activity, a reminder message 1501 is shown in the registration page of the real-money app notifying that the user will receive an additional reward in the social app 1302 upon completion of their registration in the real-money app.

Figure 16:
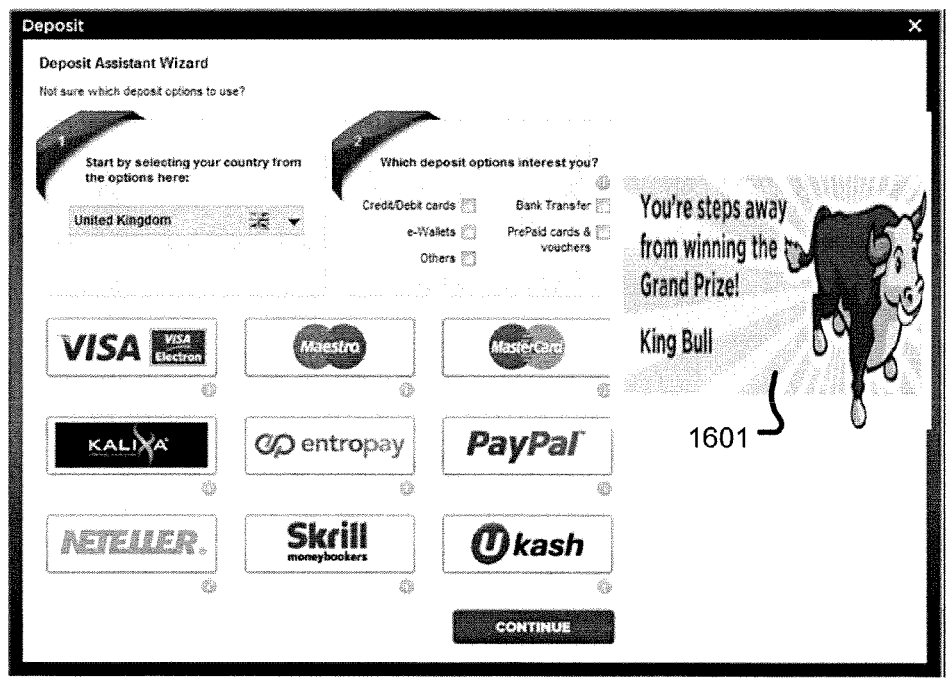
FIG. 16 shows an example deposit page of the real-money app that can be displayed to the user upon the user's action to proceed with registration, in accordance with one embodiment of the present invention.

FIG. 16 shows an example deposit page of the real-money app ZYNGAPLUSCASINO that can be displayed to the user upon the user's action to proceed with registration, in accordance with one embodiment of the present invention. As part of the cross-promotion activity, a reminder message 1601 is shown in the deposit page of the real-money app notifying that the user will receive an additional reward in the social app 1302 upon completion of their registration in the real-money app.

Figure 17:
FIG. 17 shows an example of the social app after the user has completed a portion of the cross-promotion activity in the real-money app, in accordance with one embodiment of the present invention.

FIG. 17 shows an example of the social app 1302 after the user has completed a portion of the cross-promotion activity in the real-money app, in accordance with one embodiment of the present invention. In the example of FIG. 17, the user is awarded a spotted cow 1701 as an in-game object that will persist on the user's game board in the social app 1302 FARMVILLE, in exchange for the user having visited the real-money app ZYNGAPLUSCASINO by selection of the control object 1303 within the in-game message 1301. The in-game object, e.g., the spotted cow, serves as a communication channel through which messages 1703 can be displayed to the user regarding the real-money app and/or the cross-promotion activity between the social app 1302 and the real-money app.

For example, the in-game object can be used to display messages to incentivize the user to visit the real-money app and complete a next process within the real-money app, such as registering or making a deposit. Also, the in-game object can be used to communicate offers available to the user within the real-money app. For example, if the user is actively playing the social app 1302 but has stopped playing the real-money app, the in-game object within the social app 1302 can be used to display a message to the user in the social app 1302 of a special promotion that is currently offered in the real-money app, thereby incentivizing the user to return to the real-money app.

Figure 18:
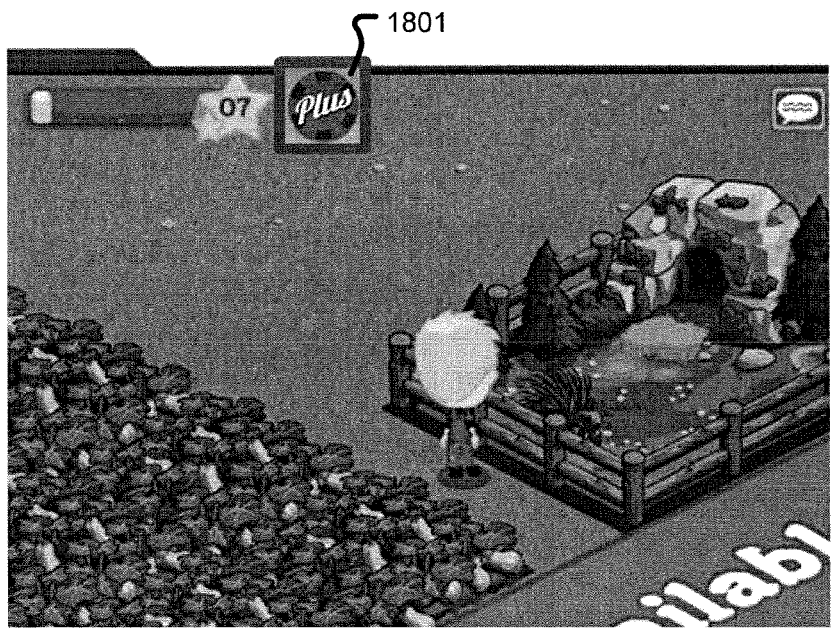
FIG. 18 shows another example of the social app after the user has completed a portion of the cross-promotion activity in the real-money app, in accordance with one embodiment of the present invention.

FIG. 18 shows another example of the social app 1302 after the user has completed a portion of the cross-promotion activity in the real-money app, in accordance with one embodiment of the present invention. In the example of FIG. 18, the reward given to the user as part of the cross-promotion activity was game currency for use in the social app 1302. Because there was no in-game object offered in this cross-promotion activity, a persistent user interface element 1801 is provided on the user's game board in the social app 1302. The user can interact with, i.e., select, the persistent user interface element 1801 to view rewards available in the real-money app for visiting, registering, and/or depositing within the real-money app.

It should be understood that the cross-promotion activity described above is defined to promote user participation in a real-money app from other social apps that the user may play. The real-money app is linked to the social app through an in-game object or persistent user interface element (PUIE) placed in the social app. The in-game object/PUIE can be introduced within the social app upon performance of an initial activity by the user within the real-money app. As further required activities are performed by the user within the real-money app, the in-game object/PUIE within the social app can be modified to more advanced status. Therefore, a desire to advance the status of the in-game object/PUIE in the social app can motivate the user to perform the required activities in the real-money app.

Also, the in-game object/PUIE in the social app can be used as a communication channel/object for the real-money app within the social app, such that messages about the user's situation/activities in the real-money app can be conveyed to the user through the in-game object/PUIE in the social app, when the user is playing the social app. Also, information regarding the in-game object/PUIE in the user's social app can be communicated to the user through the user's virtual vault 101, when the user is playing the real-money app.

Figure 19:
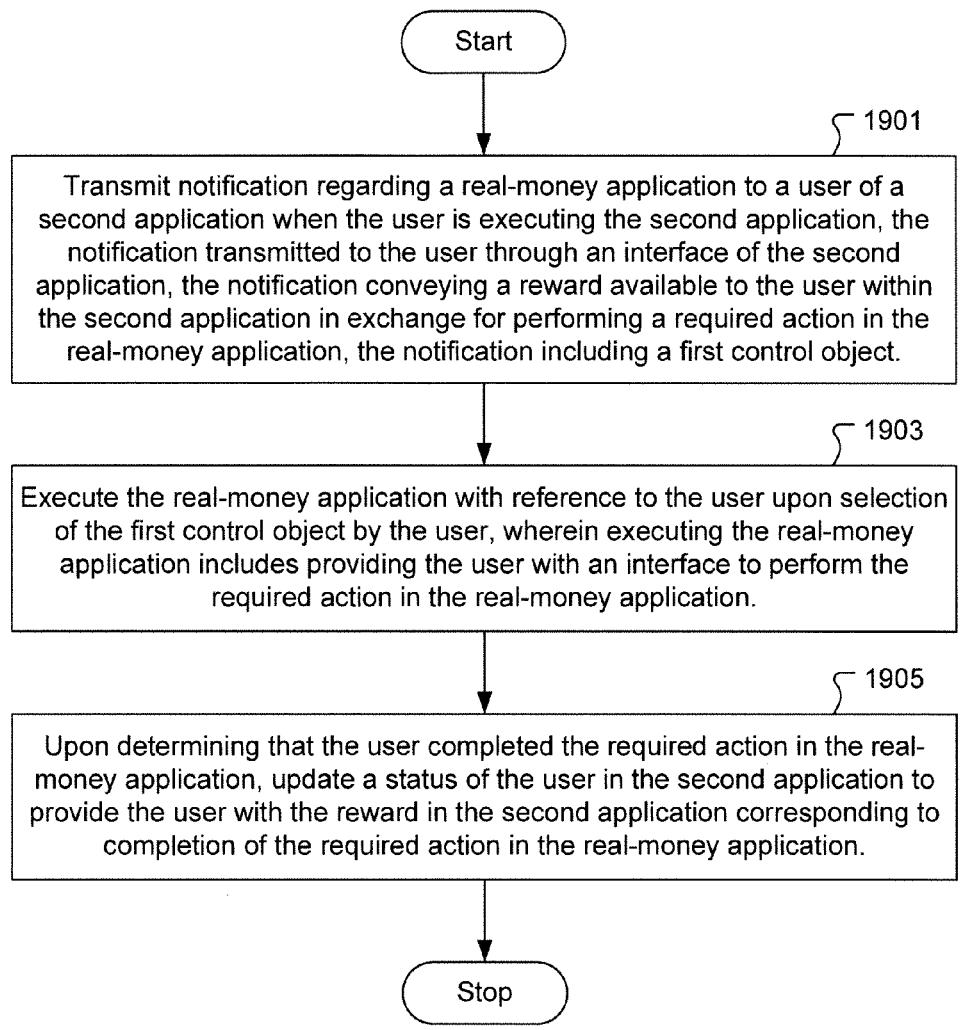
FIG. 19 shows a flowchart of a method for executing a computer application, in accordance with one embodiment of the present invention.

FIG. 19 shows a flowchart of a method for executing a computer application, in accordance with one embodiment of the present invention. In one embodiment, a system for managing a computer application includes a plurality of servers for executing a computer application, wherein one or more of the plurality of servers include logic for performing the operations of the method of FIG. 19. The method includes an operation 1901 for transmitting a notification regarding a real-money application to a user of a second application when the user is executing the second application. In some embodiments, the real-money application is an online casino game. And, in some embodiments, the second application is a social app, such as a social game application. The notification is transmitted to the user through an interface of the second application.

The notification conveys a reward available to the user within the second application in exchange for performing a required action in the real-money application. The notification also includes a first control object. In some embodiments, the notification includes a visual depiction of the reward available to the user within the second application and an explanation of the required action in the real-money application. In some embodiments, the reward is a series of related rewards, and the required action is a series of required actions respectively corresponding to the series of related rewards. In some embodiments, the reward available to the user within the second application is related to a current state of the user in the second application.

In some embodiments, the required action in the real-money application is defined to draw the user into more extensive participation in the real-money application. In some embodiments, the required action in the real-money application includes one or more of completing a registration process, making an initial deposit, and making an additional deposit. In some embodiments, the reward available to the user within the second application is defined to link actions of the user in the real-money application to an advancement of the status of the user in the second application.

The method also includes an operation 1903 for executing the real-money application with reference to the user upon selection of the first control object by the user. Executing the real-money application includes providing the user with an interface to perform the required action in the real-money application. The method also includes an operation 1905 for updating a status of the user in the second application to provide the user with the reward in the second application corresponding to completion of the required action in the real-money application, upon determining that the user completed the required action in the real-money application. In some embodiments, the reward provided to the user in the second application is used as a communication channel through which messages related to the real-money application are conveyed to the user during execution of the second application by the user.

In some embodiments, the second app is a social app, such as a social game application. In some embodiments, the social app may be executed within a social network or in connection to a social network. In some embodiments, the reward available to the user within the second application is defined as an in-game object within the social game application. In some embodiments, the in-game object is defined to improve in conjunction with additional actions by user in the real-money application. In some embodiments, the in-game object is used as a communication channel through which messages related to the real-money application are conveyed to the user during execution of the social game application by the user.

In some embodiments, after receipt of the reward by the user in the second application, an action performed by the user in the second application triggers conveyance of a real-money reward to the user in the real-money application. In these embodiments, the method can also include an operation for placing the real-money reward in a virtual vault for the user in the real-money application. The virtual vault is defined to hold in trust the real-money reward for the user until the user is qualified to claim the real-money reward and takes action to claim the real-money reward.

Figure 20:
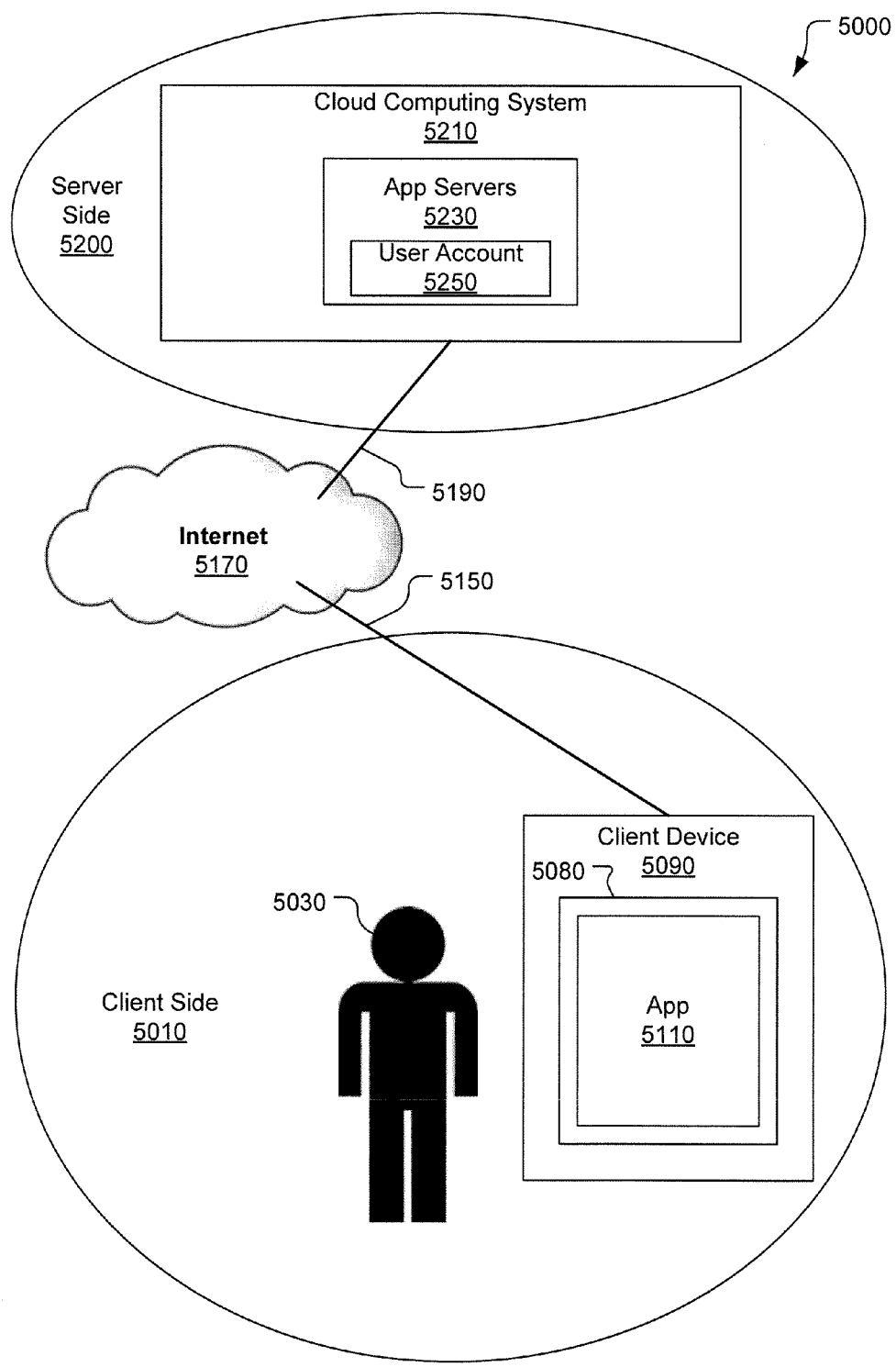
FIG. 20 shows a system for implementing the methods disclosed herein, in accordance with one embodiment of the present invention.

FIG. 20 shows a system 5000 for implementing the methods disclosed herein, in accordance with one embodiment of the present invention. It should be understood that any of the methods described herein, particularly those described with regard to FIGS. 11, 12, and 19 can be executed using the system 5000. However, it should also be understood that the methods described herein can also be executed with systems that differ from the system 5000.

The system 5000 includes a client device 5090 executing a computer application (app) 5110 under the control of a user 5030. Video of the app 5110 is rendered on a display 5080 of the client device 5090. The client device 5090 can be any type of computing device properly equipped to execute the program instructions of the app and render a visual display of graphical images/video associated with execution of the app, such as a desktop computer, a laptop computer, a tablet computer, a smartphone, among others.

The client device 5090 is in communication with a cloud computing system 5210 through a network 5170, such as the Internet, as indicated by connections 5150 and 5190. The cloud computing system 5210 represents a server-side 5200 of the system 5000, with the client device 5090 and game player 5030 representing a client-side 5010 of the system 5000. The cloud computing system 5210 includes a plurality of servers 5230 for executing apps. One or more of the plurality of servers 5230 is/are defined to provide support and direction to the app 5110 executing on the client device 5090. In one embodiment, the app 5110 executes in conjunction with instructions received from at least one of the plurality of app servers 5230. At least one of the plurality of app servers 5230 can also include a user account 5250 for the user 5030. The user account 5250 can be defined to store profile data for the user 5030, such as identification and preferences of the user 5030, as well as parametric data associated with the user's execution of the app 5110. Also, in some instances, the user 5030 may be required to provide login credentials to the app server 5230 as part of initiating execution of the app 5110 and accessing the user account 5250 of the user 5030.

Figure 21:
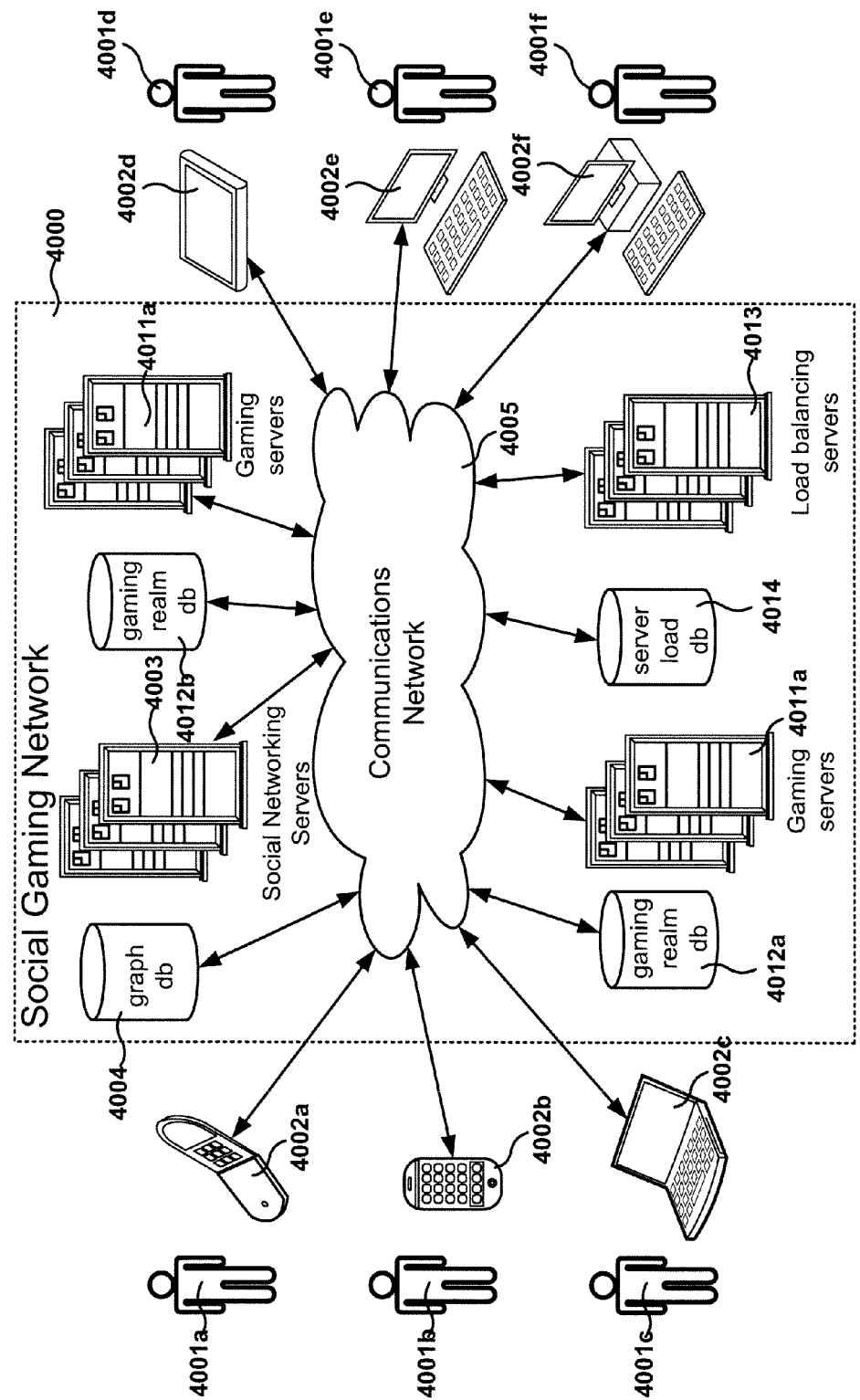
FIG. 21 illustrates a social gaming network architecture for implementing the methods disclosed herein, in accordance with one embodiment of the present invention.

FIG. 21 shows a block diagram illustrating a social gaming network architecture for implementing the methods disclosed herein, in accordance with one embodiment of the present invention. In some implementations, a plurality of players (e.g., 4001a-4001f) may be utilizing a social gaming network 4000. Each player interacts with the social gaming network via one or more client devices (e.g., client devices 4002a-4002f). The clients may communicate with each other and with other entities affiliated with the gaming platform via communications network 4005. Further, the players may be utilizing a social networking service provided by a social networking server (e.g., social networking servers 4003) to interact with each other.

When a player provides an input into the player's client device, the client device may in response send a message via the communications network to the social networking server. The social networking server may update the player profile, save the message to a database, send messages to other players, etc. The social gaming network may include a social graph database 4004, which stores player relationships, social player profiles, player messages, and player social data.

The gaming servers 4011a host one or more gaming applications, and perform the computations necessary to provide the gaming features to the players and clients. One or more gaming realm databases (e.g., 4012a-4012b) store data related to the gaming services, such as the gaming applications and modules, virtual gaming environment ("realm") data, player gaming session data, player scores, player virtual gaming profiles, game stage levels, etc. The gaming servers 4011a may utilize the data from the gaming realm databases to perform the computations related to providing gaming services for the players. In some implementations, a server load database 4014 stores gaming server load statistics, such as computational load, server responses times, etc. The social gaming network may include a load balancing server 4013.

Figure 22:
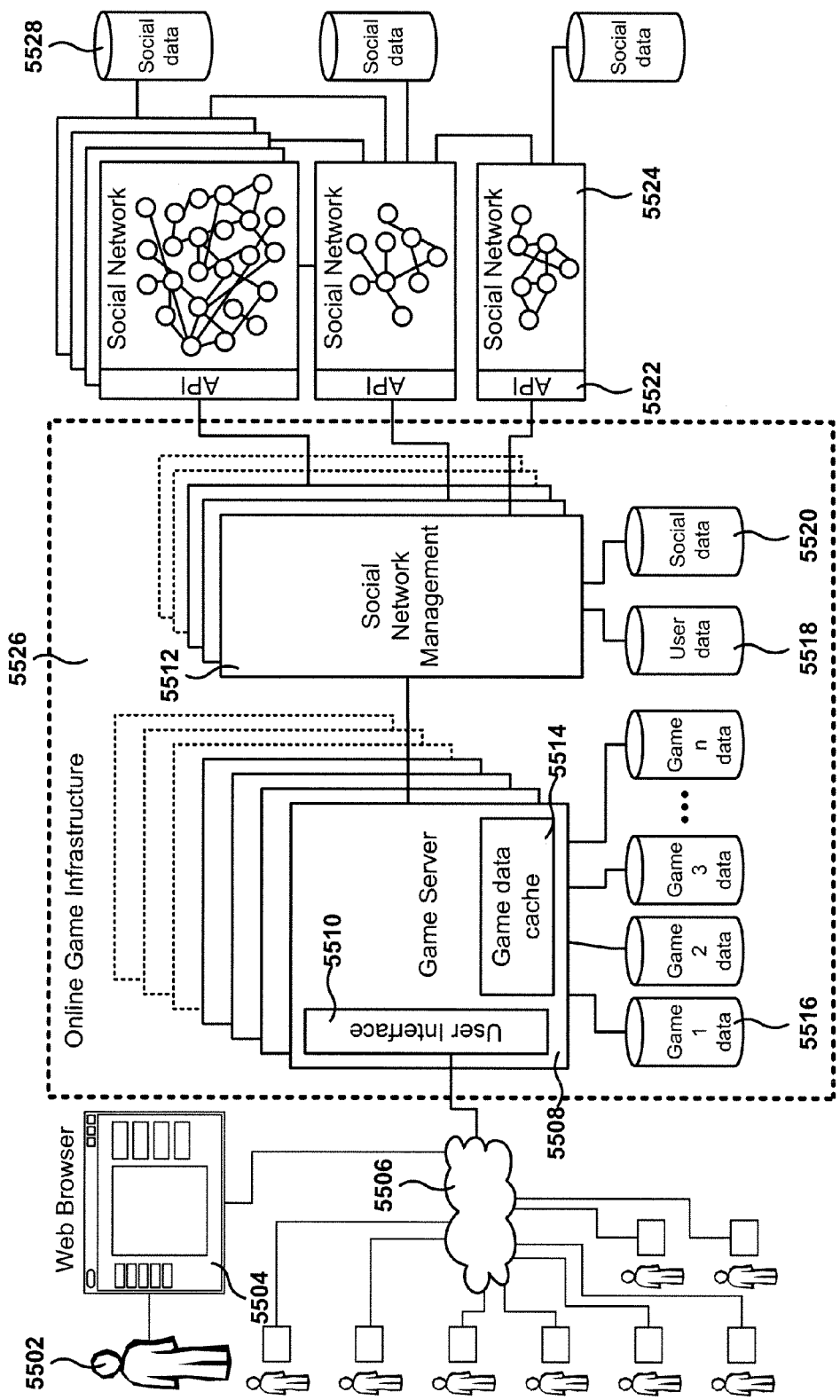
FIG. 22 illustrates an online game infrastructure for implementing the methods disclosed herein, in accordance with one embodiment of the present invention.

FIG. 22 illustrates an implementation of an online game infrastructure for implementing the methods disclosed herein, in accordance with one embodiment of the present invention. The online game infrastructure 5526 includes one or more game servers 5508, web servers (not shown), one or more social network management servers 5512, and databases to store game related information. In one embodiment, game server 5508 provides a user interface 5510 for players 5502 to play the online game. In one embodiment, game server 5508 includes a Web server for players 5502 to access the game via web browser 5504, but the Web server may also be hosted in a server different from game server 5508. Network 5506 interconnects players 5502 with the one or more game servers 5508.

Each game server 5508 has access to one or more game databases 5516 for keeping game data. In addition, a single database can store game data for one or more online games. Each game server 5508 may also include one or more levels of caching. Game data cache 5514 is a game data cache for the game data stored in game databases 5516. For increased performance, caching may be performed in several levels of caching.

The number of game servers 5508 changes over time, as the gaming platform is an extensible platform that changes the number of game servers according to the load on the gaming infrastructure. As a result, the number of game servers will be higher during peak playing times, and the number of game servers will be lower during off-peak hours.

One or more social network management servers 5512 provide support for the social features incorporated into the online games. The social network management servers 5512 access social data 5528 from one or more social networks 5524 via Application Programming Interfaces (API) 5522 made available by the social network providers. Each social network 5524 includes social data 5528, and this social data 5528, or a fraction of the social data, is made available via API 5522. As in the case of the game servers, the number of social network management servers 5512 that are active at a point in time changes according to the load on the infrastructure. As the demand for social data increases, the number of social network management servers 5512 increases. Social network management servers 5512 cache user data in database 5518, and social data in database 5520. The social data might include the social networks where a player is present, the social relationships for the player, the frequency of interaction of the player with the social network and with other players, etc. Additionally, the user data kept in database 5518 may include the player's name, demographics, e-mail, games played, frequency of access to the game infrastructure, etc.

It is noted that the embodiment illustrated in FIG. 22 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 22 should therefore not be interpreted to be exclusive or limiting, but rather exemplary or illustrative.

Figure 23:
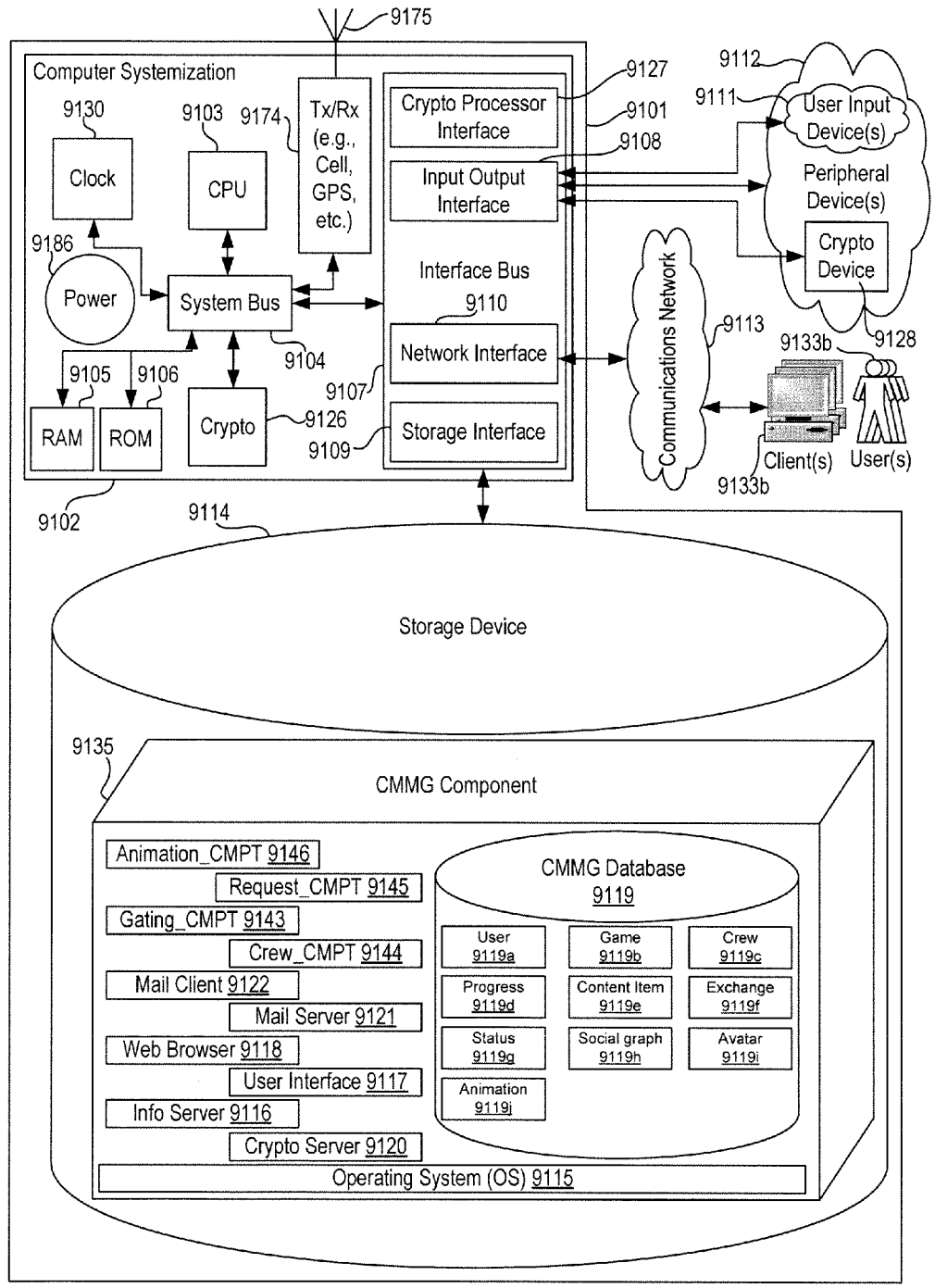
FIG. 23 shows one embodiment of a Crew Mechanics in Multiplayer Games controller that can be utilized in conjunction with the methods disclosed herein, in accordance with one embodiment of the present invention.

FIG. 23 shows one embodiment of a Crew Mechanics in Multiplayer Games (hereinafter, "CMMG") controller 9101 that can be utilized in conjunction with the methods disclosed herein, in accordance with one embodiment of the present invention. In this embodiment, the CMMG controller 9101 may serve to aggregate, process, store, search, serve, identify, instruct, generate, match, and/or facilitate interactions with a computer through software, listing service and financial management technologies, and/or other related data.

Users may engage information technology (e.g., computers) to facilitate information processing. In turn, computers employ processors to process information; such processors 9103 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed include: input and output mechanisms through which data may pass into and out of a computer; memory storage into which data may be saved; and processors by which information may be processed. These information technology resources may be used to collect data for later retrieval, analysis, and manipulation, which may be facilitated through a database program.

In one embodiment, the CMMG controller 9101 may be connected to and/or communicate with: a processor 9103 or central processing unit ("CPU"); one or more users from user input devices 9111; peripheral devices 9112; an optional cryptographic processor device 9128; and/or a communications network 9113.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers and/or clients across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The CMMG controller 9101 may be based on a computer systemization 9102 connected to the CMMG component 9135. The CMMG controller 9101 transforms in game status of a user's social content item via CMMG components into a content item with layered integration of additional content indicative of status. In one embodiment, the CMMG component may include a gating_component 9143 and a crew_component 9144. In one embodiment, the CMMG component may further include a request_component 9145 and an animation_component 9146. Depending on the implementation, one or more of the noted components may operate on a dedicated server, performed through an associated cloud service or by using a hybrid cloud technique. The hybrid cloud technique may include using platform-oriented and/or service-oriented cloud architectures in combination with a dedicated server.

A computer systemization 9102 may comprise a clock 9130, central processing unit ("CPU(s)" and/or "processor(s)" (these terms are used interchangeable throughout the disclosure unless noted to the contrary)) 9103, a memory (e.g., a read only memory (ROM) 9106, a random access memory (RAM) 9104, etc.), and/or an interface bus 9107. These components may be interconnected and/or communicating through a system bus 9104 on one or more (mother)board(s) 9102 having conductive and/or otherwise transportive circuit pathways through which instructions (e.g., binary encoded signals) may travel to effectuate communications, operations, storage, etc. The computer systemization may be connected to a power source 9186. The power source may be external or internal to the respective computer systemization. A cryptographic processor 9126 and/or transceivers (e.g., ICs) 9174 may be connected to the system bus. In another embodiment, the cryptographic processor and/or transceivers may be connected as either internal and/or external peripheral devices 9112 via the interface bus I/O. The transceivers may be connected to antenna(s) 9175, thereby effectuating wireless transmission and reception of various communication and/or sensor protocols. For example, the antenna(s) may connect to: a Texas Instruments WiLink WL1283 transceiver chip (e.g., providing 802.11n, Bluetooth 3.0, FM, global positioning system (GPS) (thereby allowing CMMG controller to determine its location)); Broadcom BCM4329FKUBG transceiver chip (e.g., providing 802.11n, Bluetooth 2.1+EDR, FM, etc.); a Broadcom BCM47501UB8 receiver chip (e.g., GPS); an Infineon Technologies XGold 618-PMB9800 (e.g., providing 2G/3G HSDPA/HSUPA communications); and/or the like. The system clock may include a crystal oscillator and generates a base signal through the computer systemization's circuit pathways. The clock may be coupled to the system bus and various clock multipliers that may increase or decrease the base operating frequency for other components interconnected in the computer systemization. The clock and various components in a computer systemization may drive signals embodying information. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in some embodiments, any of the above components may be connected directly to one another, connected to the CPU, and/or organized in numerous variations.

The CPU may comprise data processor adequate to execute program components for executing user and/or CMMG-generated requests. A processor may include specialized processing units. For example, a processor may include integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to data processing techniques. Such instruction passing facilitates communication within the CMMG controller and beyond through various interfaces. Should processing requirements dictate a greater amount speed and/or capacity, distributed processors (e.g., Distributed CMMG), mainframe, multi-core, parallel, and/or super-computer architectures may similarly be employed. Alternatively, should deployment requirements dictate greater portability, smaller Personal Digital Assistants (PDAs) may be employed.

Features of the CMMG may be achieved by implementing a microcontroller such as CAST's R8051XC2 microcontroller; Intel's MCS 51 (i.e., 8051 microcontroller); and/or the like. Some feature implementations may include embedded components, such as: Application-Specific Integrated Circuit ("ASIC"), Digital Signal Processing ("DSP"), Field Programmable Gate Array ("FPGA"), and/or the like embedded technology. For example, any of the CMMG component collection (distributed or otherwise) and/or features may be implemented via the microprocessor and/or via embedded components; e.g., via ASIC, coprocessor, DSP, FPGA, and/or the like. Alternately, some implementations of the CMMG may be implemented with embedded components that are configured and used to achieve a variety of features or signal processing.

The embedded components may include software solutions, hardware solutions, and/or some combination of both hardware/software solutions. For example, CMMG features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects may be programmed by the customer or designer to implement the CMMG features. A hierarchy of programmable interconnects allow logic blocks to be interconnected as needed by the CMMG administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. The CMMG may be developed on FPGAs and/or migrated into a fixed version that more resembles ASIC implementations. Alternate or coordinating implementations may migrate CMMG controller features to a final ASIC instead of or in addition to FPGAs. Embedded components and microprocessors may be considered the "CPU" and/or "processor" for the CMMG.

The power source 9186 may be of any form for powering electronic circuit board devices. Power cells may include alkaline, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 9186 may be connected to at least one of the interconnected subsequent components of the CMMG platform thereby providing an electric current to all subsequent components. In one example, the power source 9186 is connected to the system bus component 9104. An outside power source 9186 may be connected across the I/O 9108 interface. For example, a USB and/or IEEE 1394 connection carries both data and power across the connection and is therefore a suitable source of power.

Interface bus(ses) 9107 may accept, connect, and/or communicate to a number of interface adapters, conventionally although not necessarily in the form of adapter cards, such as but not limited to: input output interfaces (I/O) 9108, storage interfaces 9109, network interfaces 9110, and/or the like. Optionally, cryptographic processor interfaces 9127 similarly may be connected to the interface bus. The interface bus provides for the communications of interface adapters with one another as well as with other components of the computer systemization. Interface adapters are adapted for a compatible interface bus. Interface adapters may connect to the interface bus via a slot architecture. Some slot architectures may include: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 9109 may accept, communicate, and/or connect to a number of storage devices such as, but not limited to: storage devices 9114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 9110 may accept, communicate, and/or connect to a communications network 9113. Through a communications network 9113, the CMMG controller is accessible through remote clients 9133*b* (e.g., computers with web browsers) by users 9133*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed CMMG), architectures may similarly be employed to pool, load balance, and/or otherwise increase the communicative bandwidth required by the CMMG controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 9110 may be used to engage with various communications network types 9113. For example, multiple network interfaces may be employed to allow for the communication over broadcast, multicast, and/or unicast networks.

Input Output interfaces (I/O) 9108 may accept, communicate, and/or connect to user input devices 9111, peripheral devices 9112, cryptographic processor devices 9128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 9111 often are a type of peripheral device 9112 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 9112 may be connected and/or communicate to I/O and/or other facilities of the like such as network interfaces, storage interfaces, directly to the interface bus, system bus, the CPU, and/or the like. Peripheral devices may be external, internal and/or part of the CMMG controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 9128), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the CMMG controller may be embodied as an embedded, dedicated, and/or monitor-less (i.e., headless) device, wherein access would be provided over a network interface connection.

Cryptographic units such as, but not limited to, microcontrollers, processors 9126, interfaces 9127, and/or devices 9128 may be attached, and/or communicate with the CMMG controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Generally, any mechanization and/or embodiment allowing a processor to affect the storage and/or retrieval of information is regarded as memory 9129. However, memory is a fungible technology and resource, thus, any number of memory embodiments may be employed in lieu of or in concert with one another. It is to be understood that the CMMG controller and/or a computer systemization may employ various forms of memory. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory will include ROM 9106, RAM 9105, and a storage device 9114. A storage device 9114 may be any conventional computer storage. Storage devices may include a (fixed and/or removable) magnetic disk drive; a magneto-optical drive; an optical drive (i.e., Bluray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

The memory may contain a collection of program and/or database components and/or data such as, but not limited to: operating system component(s) 9115 (operating system); information server component(s) 9116 (information server); user interface component(s) 9117 (user interface); Web browser component(s) 9118 (Web browser); database(s) 9119; mail server component(s) 9121; mail client component(s) 9122; cryptographic server component(s) 9120 (cryptographic server); the CMMG component(s) 9135; and/or the like (i.e., collectively a component collection).

These components may be stored and accessed from the storage devices and/or from storage devices accessible through an interface bus. Although nonconventional program components such as those in the component collection, typically, are stored in a local storage device 9114, they may also be loaded and/or stored in memory such as: peripheral devices, RAM, remote storage facilities through a communications network, ROM, various forms of memory, and/or the like.

The operating system component 9115 is an executable program component facilitating the operation of the CMMG controller. Typically, the operating system facilitates access of I/O, network interfaces, peripheral devices, storage devices, and/or the like. The operating system may be a highly fault tolerant, scalable, and secure such as: Apple Macintosh OS X (Server); AT&T Plan 9; Be OS; Unix and Unix like distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. Other operating systems may also be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the CMMG controller to communicate with other entities through a communications network 9113. Various communication protocols may be used by the CMMG controller as a subcarrier transport mechanism for interaction, such as, but not limited to: multicast, TCP/IP, UDP, unicast, and/or the like.

An information server component 9116 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the CMMG controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the CMMG database 9119, operating systems, other program components, user interfaces, Web browsers, and/or the like.

Access to the CMMG database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the CMMG. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the CMMG as a query. Upon generating query results from the query, the results are passed over the bridge mechanism, and may be parsed for formatting and generation of new results Web page by the bridge mechanism. Such a new results Web page is then provided to the information server, which may supply it to the requesting Web browser. Also, an information server may contain, communicate, generate, obtain, and/or provide program component, user, and/or data communications, requests, and/or responses.

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, HTML5, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 9117 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components through textual and/or graphical facilities. The user interface provides a facility through which users may affect, interact, and/or operate a computer. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, user, and/or data communications, requests, and/or responses.

A Web browser component 9118 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, HTML5, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, user, and/or data communications, requests, and/or responses. Also, in place of a Web browser and information server, a combined application may be developed to perform similar operations of both. The combined application would similarly affect the obtaining and the provision of information to users, user agents, and/or the like from the CMMG enabled nodes.

A mail server component 9121 is a stored program component that is executed by a CPU 9103. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the CMMG. Access to the CMMG mail may be achieved through a number of APIs offered by the individual Web server components and/or the operating system. Also, a mail server may contain, communicate, generate, obtain, and/or provide program component, user, and/or data communications, requests, information, and/or responses.

A mail client component 9122 is a stored program component that is executed by a CPU 9103. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, user, and/or data communications, requests, information, and/or responses. Generally, the mail client provides a facility to compose and transmit electronic mail messages.

A cryptographic server component 9120 may include a stored program component that is executed by a CPU 9103, cryptographic processor 9126, cryptographic processor interface 9127, cryptographic processor device 9128, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component is operable to facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the CMMG may encrypt all incoming and/or outgoing communications and may serve as node within a virtual private network (VPN) with a wider communications network. The cryptographic component is operable to facilitate the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the CMMG component to engage in secure transactions if so desired. The cryptographic component facilitates the secure accessing of resources on the CMMG and facilitates the access of secured and/or remote resources For example, the cryptographic component may act as a client and/or server of secured resources. In one embodiment, the cryptographic component communicates with information servers, operating systems, other program components, and/or the like. The cryptographic component may contain, communicate, generate, obtain, and/or provide program component, user, and/or data communications, requests, and/or responses.

The CMMG database component 9119 may be embodied in a database and its stored data. The database may include a stored program component, which may be executed by the CPU; the stored program component portion configuring the CPU to process the stored data. The database may be a conventional, fault tolerant, relational, scalable, secure database such as Oracle or Sybase. Relational databases may include extensions of a flat file(s). Relational databases may comprise a series of related tables. In some embodiments, the tables may be interconnected or associated via a key field. Use of the key field allows the combination of the tables by indexing against the key field; i.e., the key fields act as dimensional pivot points for combining information from various tables. Relationships generally identify links maintained between tables by matching primary keys. Primary keys may represent fields that uniquely identify the rows of a table in a relational database. More precisely, they uniquely identify rows of a table on the "one" side of a one-to-many relationship.

In one embodiment, the CMMG database may be implemented using various standard data-structures, such as an array, hash, (linked) list, structured document or text file (e.g., XML), table, and/or the like. Such data-structures may be stored in memory and/or in (structured) files. In one embodiment, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases where objects may include encapsulated capabilities. If the CMMG database is implemented as a data-structure, the use of the CMMG database 9119 may be integrated into another component such as the CMMG component 9135. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 9119 includes several tables 9119*a-f*. A user table 9119*a* includes fields such as, but not limited to: user_name, user_identifier, user_crew and/or the like. The user table may support and/or track multiple user accounts on the CMMG platform. A game table 9119*b* includes fields such as, but not limited to: game_identifier, game_type and/or the like. The game table may support and/or track multiple game accounts on the CMMG platform. A crew table 9119*c* includes fields such as, but not limited to: crew_identifier, crew_type, crew_sector, crew_goal and/or the like. The crew table may support and/or track multiple crew on the CMMG platform. A progress table 9119*d* includes fields such as, but not limited to: progress_identifier, progress_associations, progress_index and/or the like. The progress table may support and/or track multiple progress bars on the CMMG platform. A content_item 9119*e* includes fields such as, but not limited to: content_item_identifier, content_item_associations, content_item_type, content_item_price, content_item_progress, content_item_analytics and/or the like. The content_item table may support and/or track multiple content_item accounts on the CMMG platform.

An exchange 9119*f* includes fields such as, but not limited to: exchange_identifier, exchange_type, exchange_routing_number, exchange_bank, exchange_credits, exchange_transfer, exchange_deposit_account and/or the like. The exchange table may support and/or track multiple exchange accounts on the CMMG platform. A status 9119*g* includes fields such as, but not limited to: status_identifier, status_type, status_user, status_crew, status_feed and/or the like. The status table may support and/or track multiple framework accounts on the CMMG platform. A social graph 9119*h* includes fields such as, but not limited to: social_graph_identifier, social_graph_associations, social_graph_status, social_graph_analytics and/or the like. The social graph table may support and/or track multiple social graphs on the CMMG platform. An avatar table 9119*i* includes fields such as, but not limited to: avatar_identifier, avatar_type, avatar_status, avatar_associations, avatar_modifications and/or the like. The avatar table may support and/or track multiple avatars on the CMMG platform. An animation table 9119*j* includes fields such as, but not limited to: animation_identifier, animation_type, animation_associations and/or the like. The animation table may support and/or track multiple animations on the CMMG platform.

In one embodiment, the CMMG database may interact with other databases. For example, employing a distributed database, queries and data access by search CMMG component may treat the combination of the CMMG database, an integrated data security layer database as a single database entity.

In one embodiment, user programs may contain various user interface primitives, which may serve to update the CMMG. Also, various accounts may require custom database tables depending upon the environments and the types of clients the CMMG may need to serve. It should be noted that any unique fields may be designated as a key field throughout. In an alternative embodiment, these tables have been decentralized into their own databases and their respective database controllers (i.e., individual database controllers for each of the above tables). Employing advantageous data processing techniques, one may further distribute the databases over several storage devices. Similarly, configurations of the decentralized database controllers may be varied by consolidating and/or distributing the various database components 9119. The CMMG may be configured to keep track of various settings, inputs, and parameters via database controllers.

The CMMG database may communicate to and/or with other components in a component collection, including itself, and/or facilities of the like. Most frequently, the CMMG database communicates with the CMMG component, other program components, and/or the like. The database may contain, retain, and provide information regarding other nodes and data.

The CMMG component 9135 is a stored program component that is executed by a CPU. In one embodiment, the CMMG component incorporates any and/or all combinations of the aspects of the CMMG that was discussed in the previous figures. As such, the CMMG affects accessing, obtaining and the provision of information, services, transactions, and/or the like across various communications networks. In one embodiment, the CMMG platform transforms in game status of a user's social content item, via CMMG components 9135 into a content item with layered integration of additional content indicative of status.

The CMMG component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; HTML5; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the CMMG server employs a cryptographic server to encrypt and decrypt communications. The CMMG component may communicate to and/or with other components in a component collection, including itself, and/or facilities of the like. Most frequently, the CMMG component communicates with the CMMG database, operating systems, other program components, and/or the like. The CMMG may contain, communicate, generate, obtain, and/or provide program component, user, and/or data communications, requests, and/or responses.

The structure and/or operation of any of the CMMG node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through advantageous data processing communication techniques.

The configuration of the CMMG controller may depend on the context of implementation. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.: w3c-post http:// . . . Value1, where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of implementation.

For example, in some implementations, the CMMG controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database.

It should be understood that any method operations disclosed herein can involve execution of computer-executable instructions by software written or otherwise expressed in any suitable programming language or combination of programming languages. In various embodiments, software is expressed as source code or object code. In various embodiments, software is expressed in a higher-level programming language, such as, for example, C, Pert, or a suitable extension thereof. In various embodiments, software is expressed in a lower-level programming language, such as assembly language (or machine code). In various embodiments, software is expressed in JAVA. In various embodiments, software is expressed in Hyper Text Markup Language (HTML), Extensible Markup Language (XML), or other suitable markup language.

It should be further understood that any software for performing any of the operations of the various methods disclosed herein can be recorded as computer readable code on a non-transitory computer-readable storage medium. The non-transitory computer readable storage medium is any data storage device that can store data which can be thereafter be read by a computer system. Examples of non-transitory computer readable storage media include hard drives, network attached storage (NAS), read-only memory, random-access memory, CD-ROMs, CD-Rs, CD-RWs, magnetic tapes, and other optical and non-optical data storage devices. The computer readable code can also be distributed over a network of coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for cross-platform interaction between different computer applications, comprising:
   executing a real-money application on a cloud computing system;
   executing a second application on a cloud computing system, the second application different than the real-money application;
   displaying an in-game object in a graphical display generated by executing the second application, wherein the in-game object has functionality within a context of the second application, and wherein the in-game object also provides a communication channel through which messages related to the real-money application are conveyed to a user of the second application;
   transmitting a notification regarding the real-money application to the in-game object in the second application, the notification conveying a reward available to the user within the second application in exchange for performing a required action in the real-money application, the notification including a first control object;
   upon selection of the first control object by the user, executing the real-money application to provide the user with a graphical user interface to perform the required action in the real-money application; and
   upon determining that the user completed the required action in the real-money application, providing the user with the reward in the second application corresponding to completion of the required action in the real-money application,
   wherein the in-game object in the second application maintains functionality within the context of the second application and continues providing the communication channel through which messages related to the real-money application are conveyed to the user of the second application after the user is provided with the reward in the second application corresponding to completion of the required action in the real-money application.

2. The method as recited in claim 1, wherein the notification includes a visual depiction of the reward available to the user within the second application and an explanation of the required action in the real-money application.

3. The method as recited in claim 2, wherein the reward is a series of related rewards, and wherein the required action is a series of required actions respectively corresponding to the series of related rewards.

4. The method as recited in claim 1, wherein the reward available to the user within the second application is related to a current state of the user in the second application.

5. The method as recited in claim 1, wherein the required action in the real-money application is defined to draw the user into more extensive participation in the real-money application.

6. The method as recited in claim 5, wherein the required action in the real-money application includes one or more of completing a registration process, making an initial deposit, and making an additional deposit.

7. The method as recited in claim 1, wherein the reward available to the user within the second application is defined to link actions of the user in the real-money application to an advancement of a status of the user in the second application.

8. The method as recited in claim 1, wherein after receipt of the reward by the user in the second application, an action performed by the user in the second application triggers conveyance of a real-money reward to the user in the real-money application.

9. The method as recited in claim 8, further comprising:
   placing the real-money reward in a virtual vault for the user in the real-money application, wherein the virtual vault is defined to hold in trust the real-money reward for the user until the user is qualified to claim the real-money reward and takes action to claim the real-money reward.

10. The method as recited in claim 1, wherein the second application is a social game application.

11. The method as recited in claim 10, wherein the reward available to the user within the second application is defined as a second in-game object within the social game application.

12. The method as recited in claim 1, wherein the in-game object is defined to improve upon determining that the user completed the required action in the real-money application.

13. The method as recited in claim 10, wherein the real-money application is an online casino game.

14. A method for executing a computer application as recited in claim 1, further comprising:
   monitoring actions performed by the user in the real-money application; and
   advancing a status of the user in the second application in proportion to the monitored actions performed by the user in the real-money application.

* * * * *